US012791979B2

(12) United States Patent
Taneda et al.

(10) Patent No.: US 12,791,979 B2
(45) Date of Patent: Nov. 10, 2026

(54) CARTRIDGE AND IMAGE FORMING APPARATUS

(71) Applicant: CANON KABUSHIKI KAISHA, Tokyo (JP)

(72) Inventors: Takashi Taneda, Kanagawa (JP); Naoki Maeda, Shizuoka (JP); Shunsuke Uratani, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/987,227

(22) Filed: Dec. 19, 2024

(65) Prior Publication Data

US 2025/0116964 A1 Apr. 10, 2025

Related U.S. Application Data

(63) Continuation of application No. PCT/JP2023/022838, filed on Jun. 14, 2023.

(30) Foreign Application Priority Data

Jun. 24, 2022 (JP) ................................ 2022-102277

(51) Int. Cl.
*G03G 21/18* (2006.01)
*G03G 15/02* (2006.01)
*G03G 21/00* (2006.01)

(52) U.S. Cl.
CPC ..... *G03G 21/1867* (2013.01); *G03G 15/0216* (2013.01); *G03G 15/0283* (2013.01); *G03G 21/0005* (2013.01); *G03G 21/1814* (2013.01)

(58) Field of Classification Search
CPC .......... G03G 21/1867; G03G 15/0216; G03G 15/0283; G03G 21/0005; G03G 21/1814; G03G 21/1652
See application file for complete search history.

(56) References Cited

U.S. PATENT DOCUMENTS 8,571,445 B2 10/2013 Komatsu
8,755,713 B2 6/2014 Kawai et al.
(Continued)

FOREIGN PATENT DOCUMENTS

JP 2000-122511 A 4/2000
JP 2002-328585 A 11/2002
(Continued)

OTHER PUBLICATIONS

Co-pending U.S. Appl. No. 19/010,542, filed Jan. 6, 2025.
(Continued)

*Primary Examiner* — Sandra Brase
(74) *Attorney, Agent, or Firm* — Venable LLP

(57) ABSTRACT

A developing roller is supported by a cleaning frame and used for an image forming process. An electrode plate 901 is electrically connected to the charging roller. The electrode plate 901 is exposed outside of a process cartridge and includes a contact portion 901*a* configured to contact a spring contact 911 of a main assembly. The contact portion 901*a* includes a bottom surface 901*c* which is a flat surface, an outermost surface 901*f* positioned further outside of the cleaning frame in a normal direction of the bottom surface 901*c* than the bottom surface 901*c* and an inner wall 901*d* connecting the bottom surface 901*c* and the outermost surface 901*f*.

15 Claims, 25 Drawing Sheets

(56) References Cited

U.S. PATENT DOCUMENTS

| | | | |
|---|---|---|---|
| 8,879,954 B2 | 11/2014 | Nonaka et al. | |
| 8,909,096 B2 | 12/2014 | Fukui et al. | |
| 8,942,592 B2 | 1/2015 | Uratani et al. | |
| 9,188,940 B2 | 11/2015 | Fukui et al. | |
| 9,772,598 B2 | 9/2017 | Komatsu et al. | |
| 9,778,613 B2 | 10/2017 | Komatsu et al. | |
| 10,197,967 B2 | 2/2019 | Komatsu et al. | |
| 10,386,751 B2 | 8/2019 | Hayashi et al. | |
| 10,394,182 B2 | 8/2019 | Uratani et al. | |
| 10,551,790 B2 | 2/2020 | Komatsu et al. | |
| 10,663,911 B2 | 5/2020 | Uratani et al. | |
| 11,003,129 B2 | 5/2021 | Uratani et al. | |
| 11,099,518 B2 | 8/2021 | Komatsu et al. | |
| 11,169,483 B2 | 11/2021 | Murakami et al. | |
| 11,392,081 B2 | 7/2022 | Murakami et al. | |
| 11,402,798 B2 | 8/2022 | Murakami et al. | |
| 11,500,324 B2 | 11/2022 | Komatsu et al. | |
| 11,586,140 B2 | 2/2023 | Maeda | |
| 11,720,055 B2 | 8/2023 | Murakami et al. | |
| 11,803,153 B2 | 10/2023 | Murakami et al. | |
| 11,994,824 B2 | 5/2024 | Komatsu et al. | |
| 12,019,392 B2 | 6/2024 | Murakami et al. | |
| 12,164,260 B2 | 12/2024 | Yada et al. | |
| 12,222,674 B2 | 2/2025 | Kashiide et al. | |
| 12,271,147 B2 | 4/2025 | Harada et al. | |
| 2005/0135832 A1 | 6/2005 | Kubota et al. | |
| 2013/0022368 A1 | 1/2013 | Takarada et al. | |
| 2016/0018785 A1* | 1/2016 | Takarada | G03G 21/1867 399/90 |
| 2017/0285570 A1 | 10/2017 | Sakata et al. | |
| 2018/0210393 A1 | 7/2018 | Makiguchi et al. | |
| 2020/0133188 A1* | 4/2020 | Amann | G03G 21/1652 |
| 2022/0066387 A1 | 3/2022 | Sakakibara et al. | |
| 2023/0418209 A1 | 12/2023 | Maeda et al. | |
| 2023/0418216 A1 | 12/2023 | Koga et al. | |
| 2024/0295851 A1 | 9/2024 | Murakami et al. | |
| 2024/0353789 A1 | 10/2024 | Komatsu et al. | |
| 2025/0110423 A1 | 4/2025 | Uesugi et al. | |

FOREIGN PATENT DOCUMENTS

| | | |
|---|---|---|
| JP | 2005-196144 A | 7/2005 |
| JP | 2012-063750 A | 3/2012 |
| JP | 2012-242553 A | 12/2012 |
| JP | 2013-029717 A | 2/2013 |
| JP | 2017-181703 A | 10/2017 |
| JP | 2018-210077 A | 8/2018 |
| JP | 2020-204627 A | 12/2020 |
| JP | 2022-041938 A | 3/2022 |

OTHER PUBLICATIONS

Co-pending U.S. Appl. No. 19/069,610, filed Mar. 4, 2025.

International Search Report and Written Opinion for International Patent Application No. PCT/JP2023/022838.

Feb. 17, 2026 Office Action in Japanese Patent Application No. 2022-102277 (with English translation).

* cited by examiner (a)

(b)

(a)

(b)

(c)

CARTRIDGE AND IMAGE FORMING APPARATUS

TECHNICAL FIELD

The present invention relates to a cartridge and an image forming apparatus provided with the cartridge.

BACKGROUND ART

Conventionally, it is known that a configuration in which members used for an image formation such as a photosensitive drum (process member) are integrated in a frame to form a cartridge, which is configured to be mountable and demountable with respect to a main assembly of an image forming apparatus. Such cartridge is configured so that a main assembly side electrode member provided to the main assembly and an electrode member of the cartridge contact each other in a state in which the cartridge is mounted to the main assembly, and the process member is electrically connected to the main assembly. Here, in Japanese Patent Application Laid-Open No. 2012-63750, as an example of the cartridge side electrode member, it is disclosed that a configuration in which conductive resin is injected into a frame which constitutes a cartridge.

SUMMARY OF THE INVENTION

Problem to be Solved by the Invention

Here, in a configuration in which an electrode member is provided to a cartridge, in some cases, it is preferable to use material of which flame retardancy is high as a frame of the cartridge in order to further improve electrical safety near the electrode member. Because of this, there is a problem that choices for the material for the frame is limited.

An object of the present invention is to provide a cartridge with a high degree of freedom in choices for the material for the frame.

Means for Solving the Problem

The present invention provides a cartridge comprising: a frame; a process member supported by the frame and used for an image forming process; and an electrode member electrically connected to the process member, wherein the electrode member includes an electrical contact portion exposed to outside of the cartridge and to which an electric power for being supplied to the process member is supplied from outside of the cartridge, and wherein the electrical contact portion includes a first surface which is a flat surface, a second surface positioned further outside of the frame in a normal direction of the first surface than the first surface and a connection surface connecting the first surface and the second surface.

In addition, the present invention also provides a cartridge mountable to and dismountable from a main assembly of an image forming apparatus, the cartridge comprising: a frame; a process member supported by the frame and used for an image forming process; and an electrode member electrically connected to the process member, wherein the electrode member includes an electrical contact portion exposed to outside of the cartridge and configured to contact a main assembly side electrode member of the main assembly, and wherein the electrical contact portion includes a first surface configured by a plurality of flat surfaces of which angles in normal direction thereof are different from each other and a second surface positioned further outside of the frame than the first surface.

In addition, the present invention also provides is a cartridge comprising: a photosensitive drum configured to rotate about a first rotational axis; a developing roller configured to supply toner to the photosensitive drum and rotate about a second rotational axis; a developing blade configured to regulate a layer thickness of the toner carried by developing roller; a supplying roller configured to supply the toner to the developing roller; a first electrical contact portion electrically connected to the developing roller and to which an electric power for being supplied to the developing roller is supplied from outside of the cartridge; a second electrical contact portion electrically connected to the developing blade and to which an electric power for being supplied to the developing blade is supplied from outside of the cartridge; and a third electrical contact portion electrically connected to the supplying roller and to which an electric power for being supplied to the supplying roller is supplied from outside of the cartridge, wherein in a case in which an imaginary line passing through the first rotational axis and the second rotational axis is a first imaginary line as seen in a direction of the first rotational axis, as seen in the direction of the first rotational axis, the first electrical contact portion, the second electrical contact portion and the third electrical contact portion are provided on a second imaginary line parallel to the first imaginary line and aligned in a direction where the second imaginary line extends.

Effect of the Invention

According to the present invention, it becomes possible to provide a cartridge with a high degree of freedom in choices for material for a frame.

Figure 6:
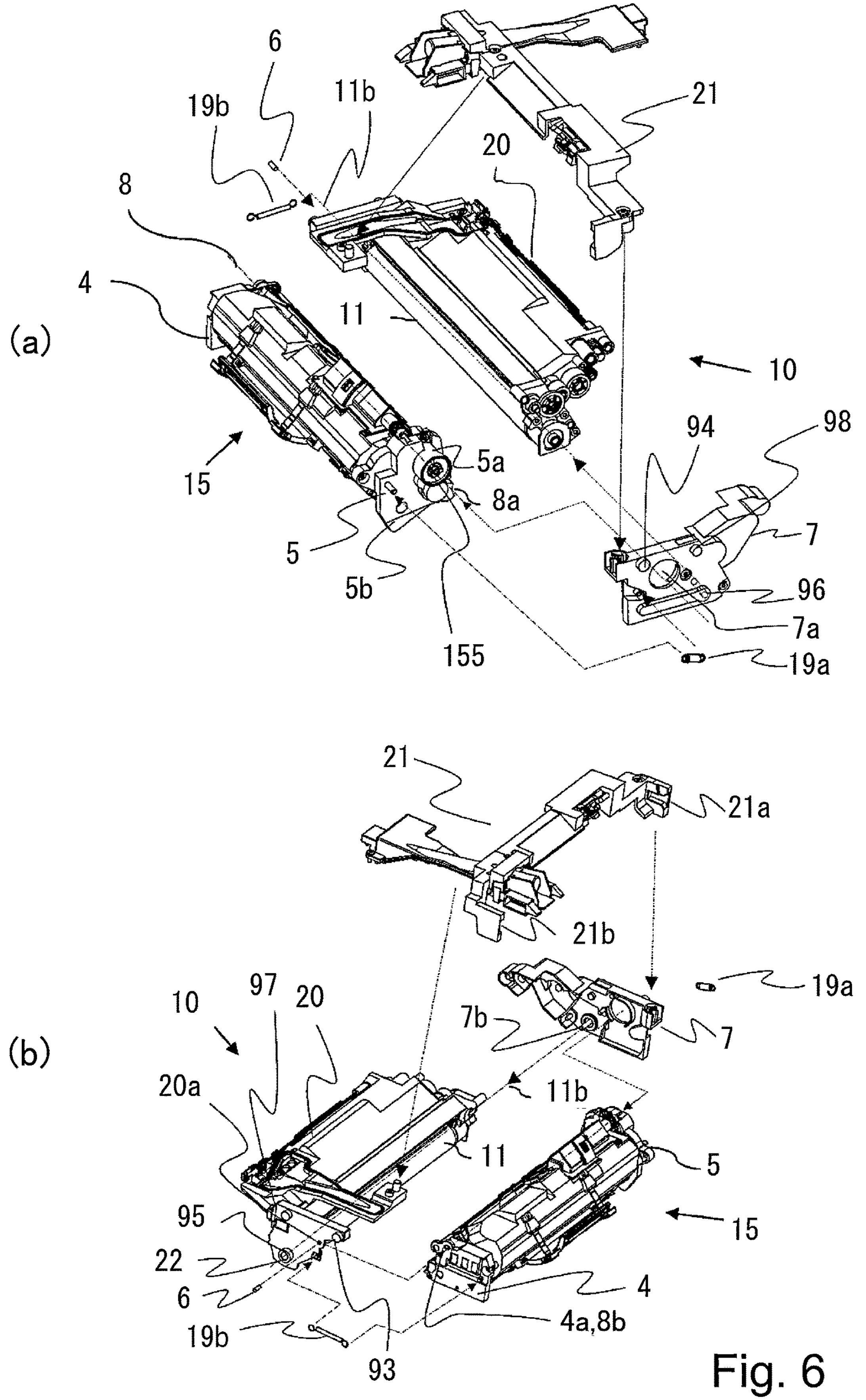

Part (a) of FIG. 6 is an exploded perspective view of the process cartridge according to the Embodiment 1, and part (b) of FIG. 6 is an exploded perspective view of the process cartridge as seen in a different direction from part (a) of FIG. 6.

Figure 7:
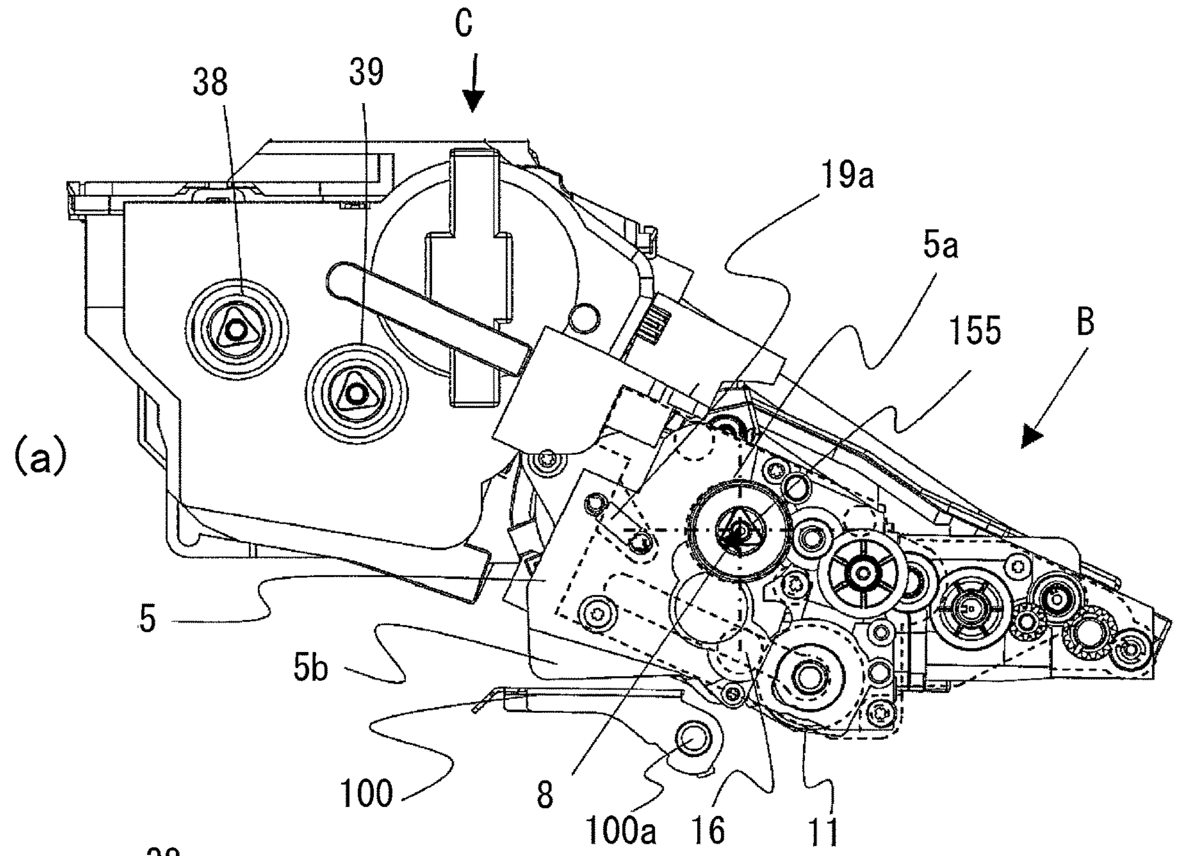
Figure 7:
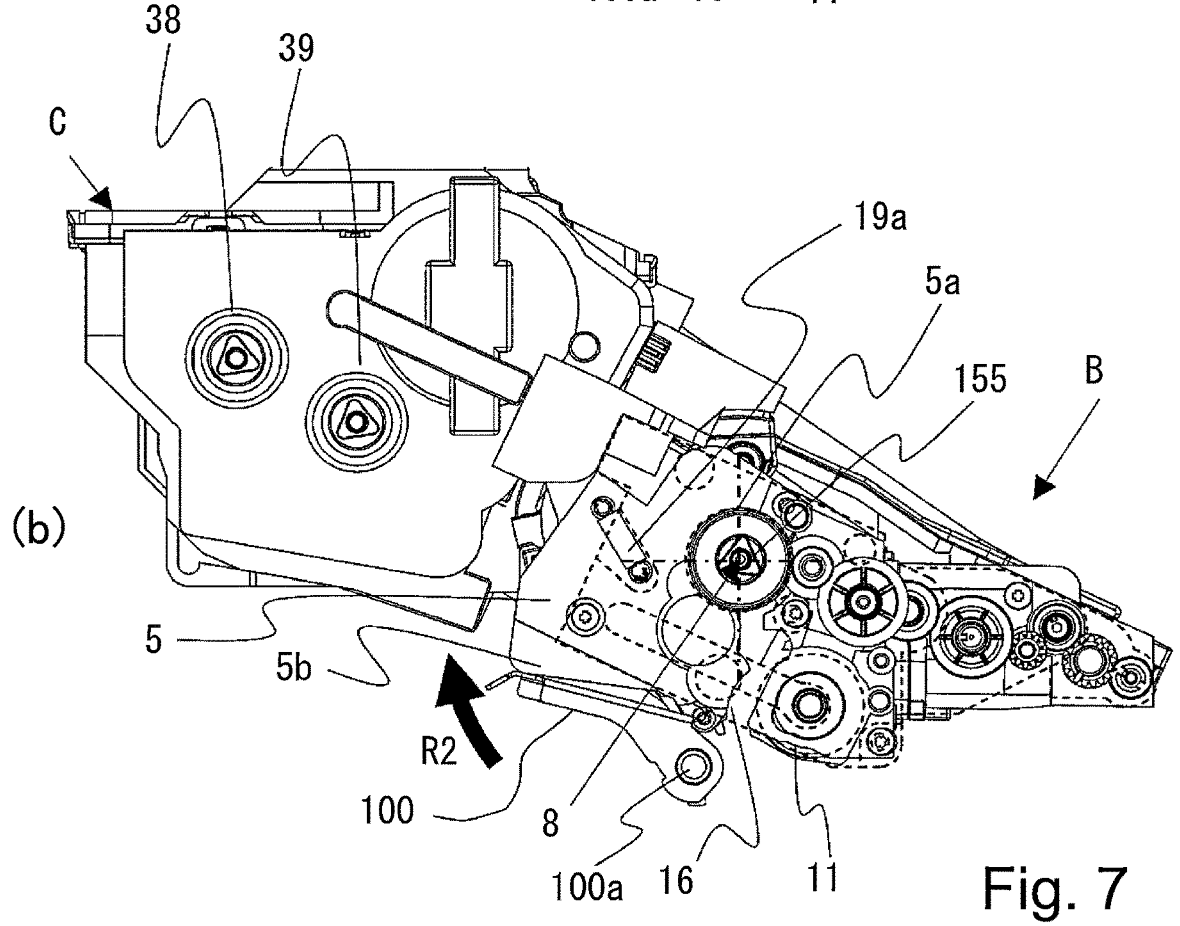

Part (a) of FIG. 7 is a side view of the process cartridge illustrating a contact state of a developing unit with respect to a photosensitive drum, and part (b) of FIG. 7 is a side view of the process cartridge illustrating a separated state of the developing unit with respect to the photosensitive drum.

Figure 8:
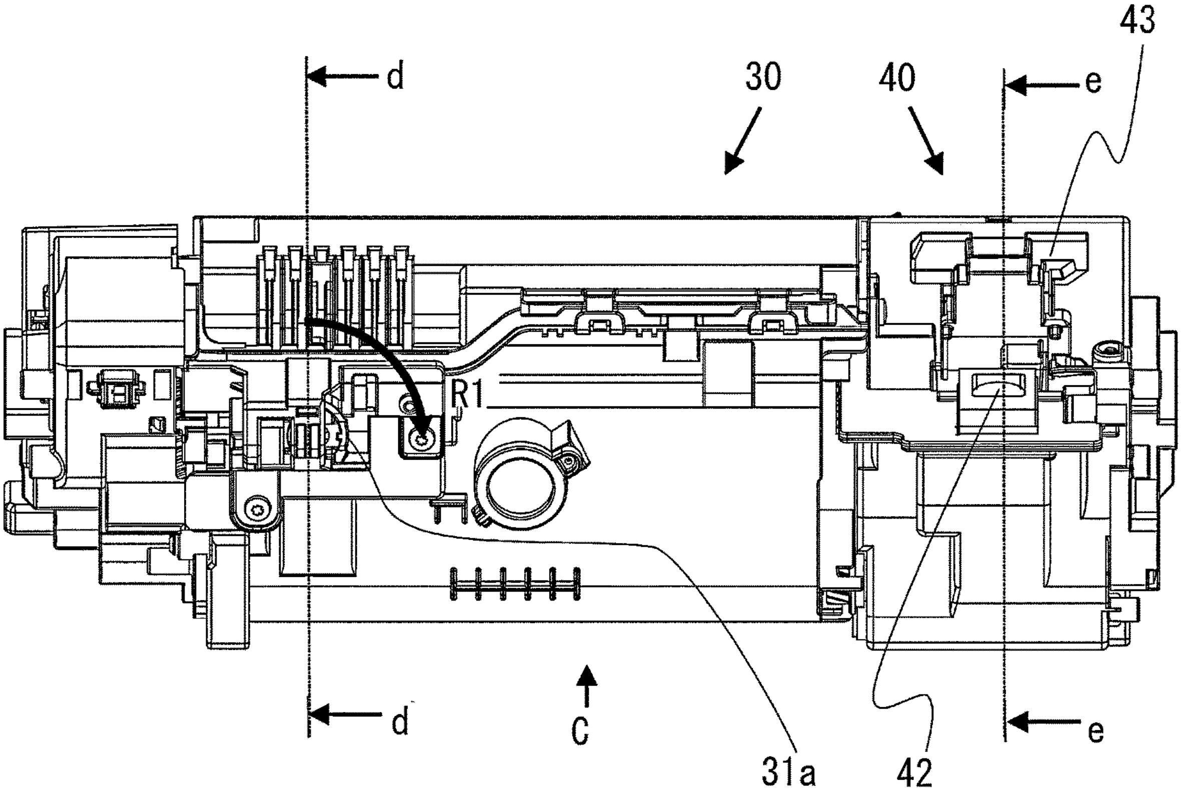

FIG. 8 is a front view of a toner cartridge according to the Embodiment 1.

Figure 9:
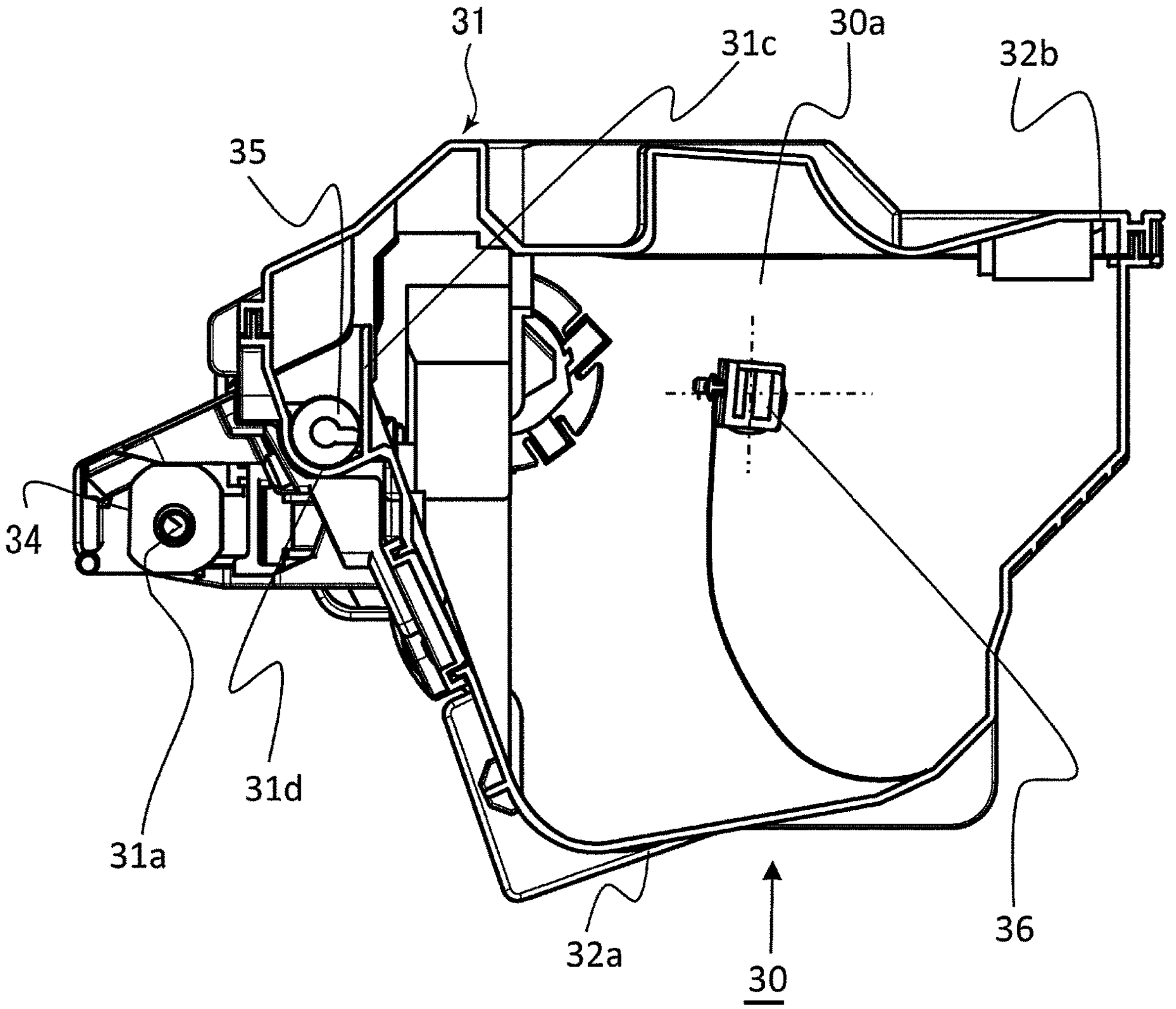

FIG. 9 is a d-d cross-sectional view of FIG. 8.

Figure 10:
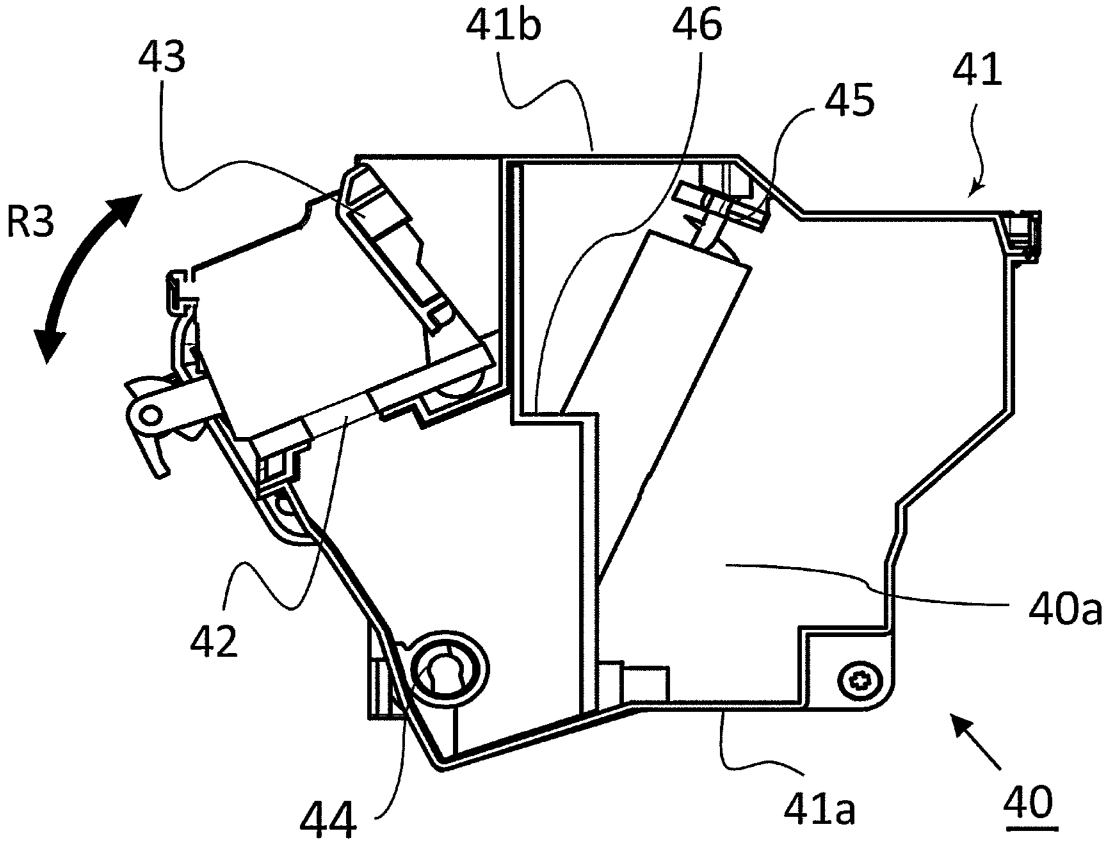

FIG. 10 is an e-e cross-sectional view of FIG. 8.

Figure 11:
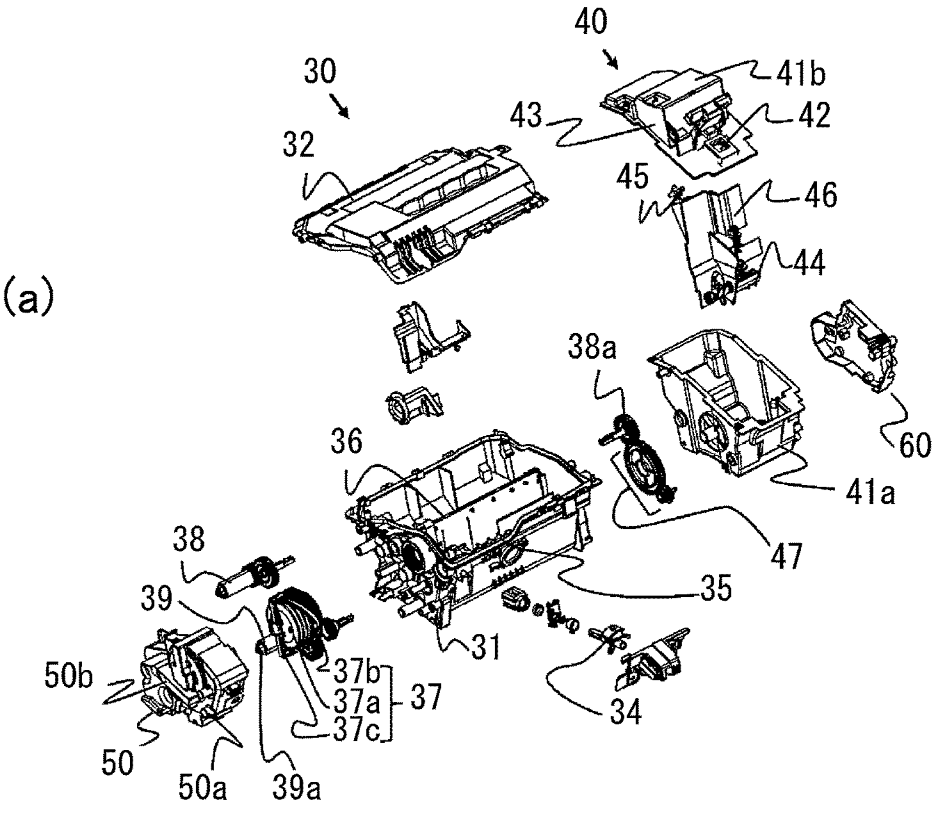
Figure 11:
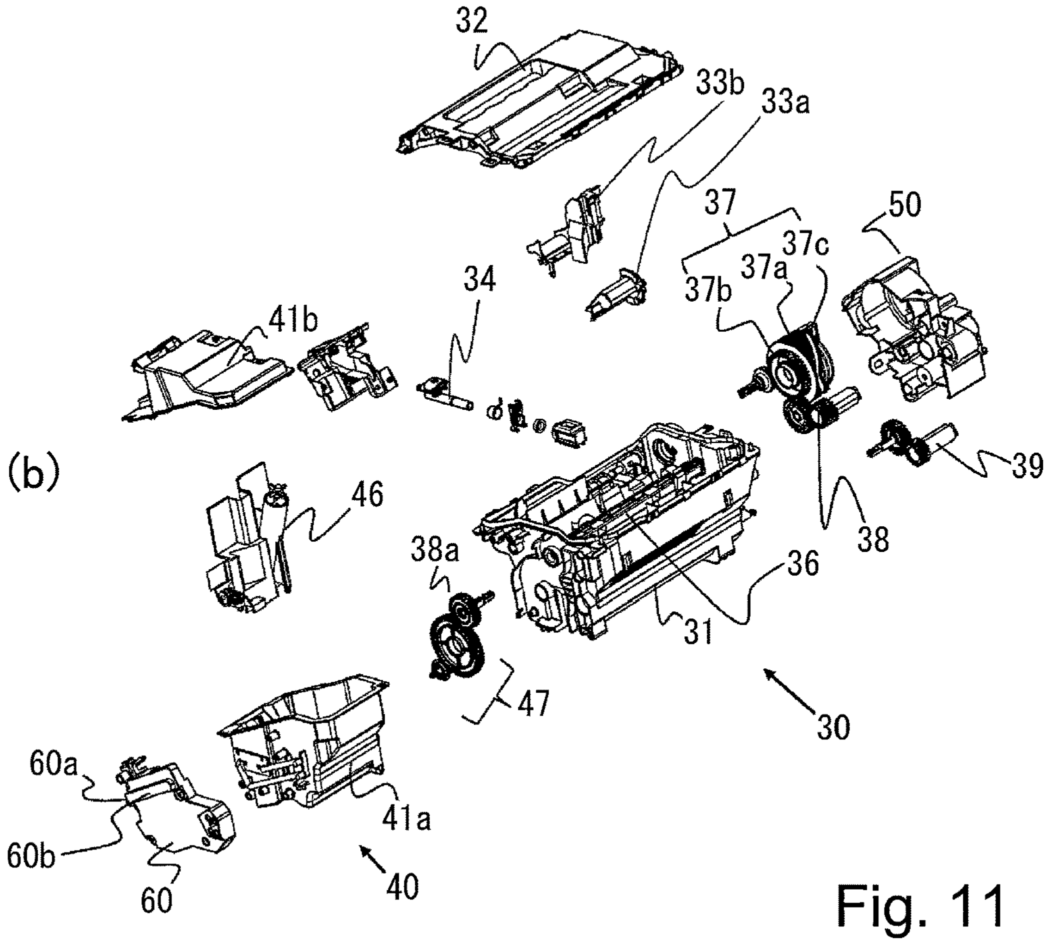

Part (a) of FIG. 11 is an exploded perspective view of the toner cartridge according to the Embodiment 1, and part (b) of FIG. 11 is an exploded perspective view of the toner cartridge as seen in a different direction from part (a) of FIG. 11.

Figure 12:
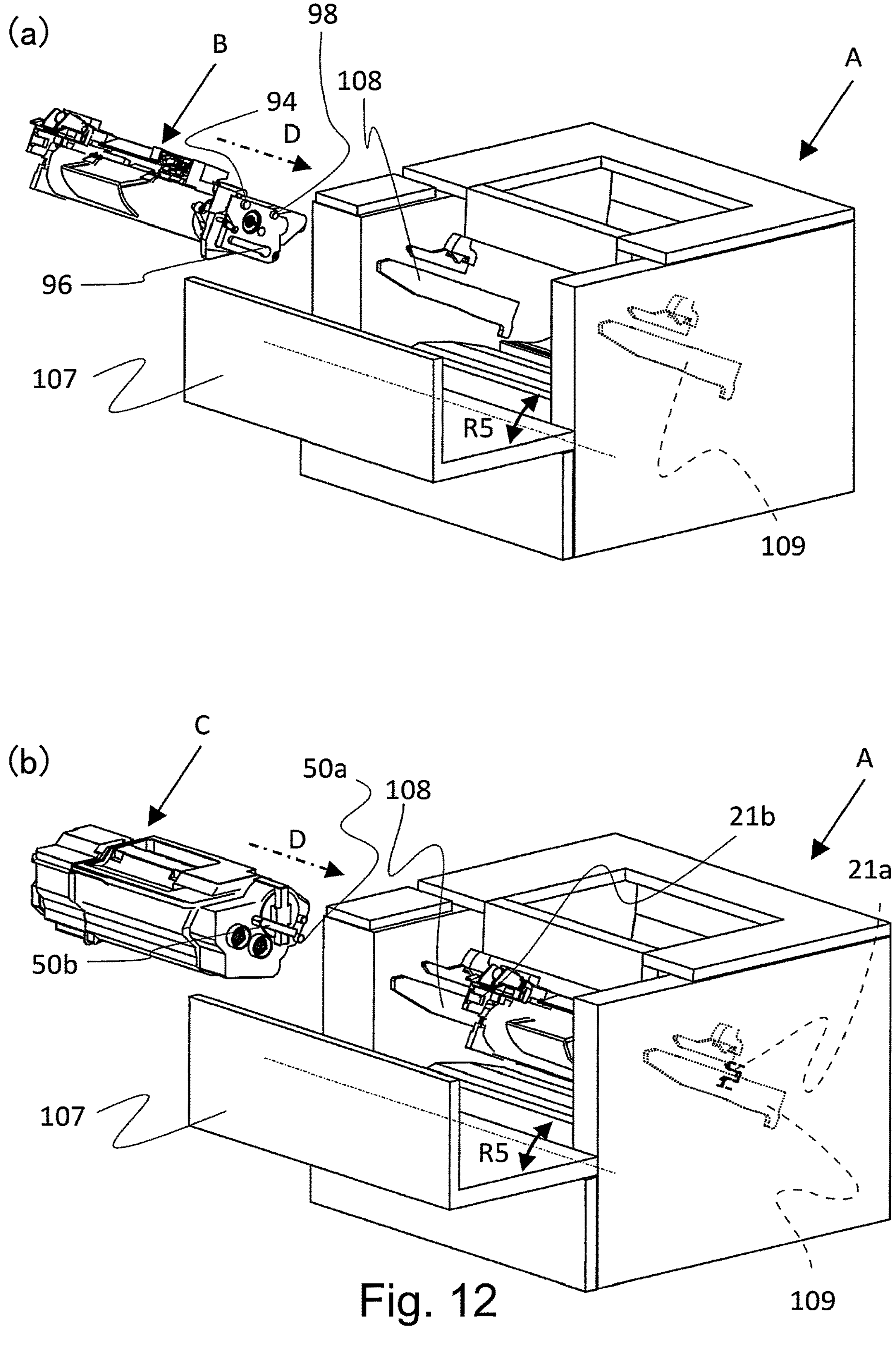

Part (a) of FIG. 12 is a schematic perspective view illustrating an inserting state of the process cartridge with respect to a main assembly, and part (b) of FIG. 12 is a schematic perspective view illustrating an inserting state of the toner cartridge with respect to the main assembly.

Figure 13:
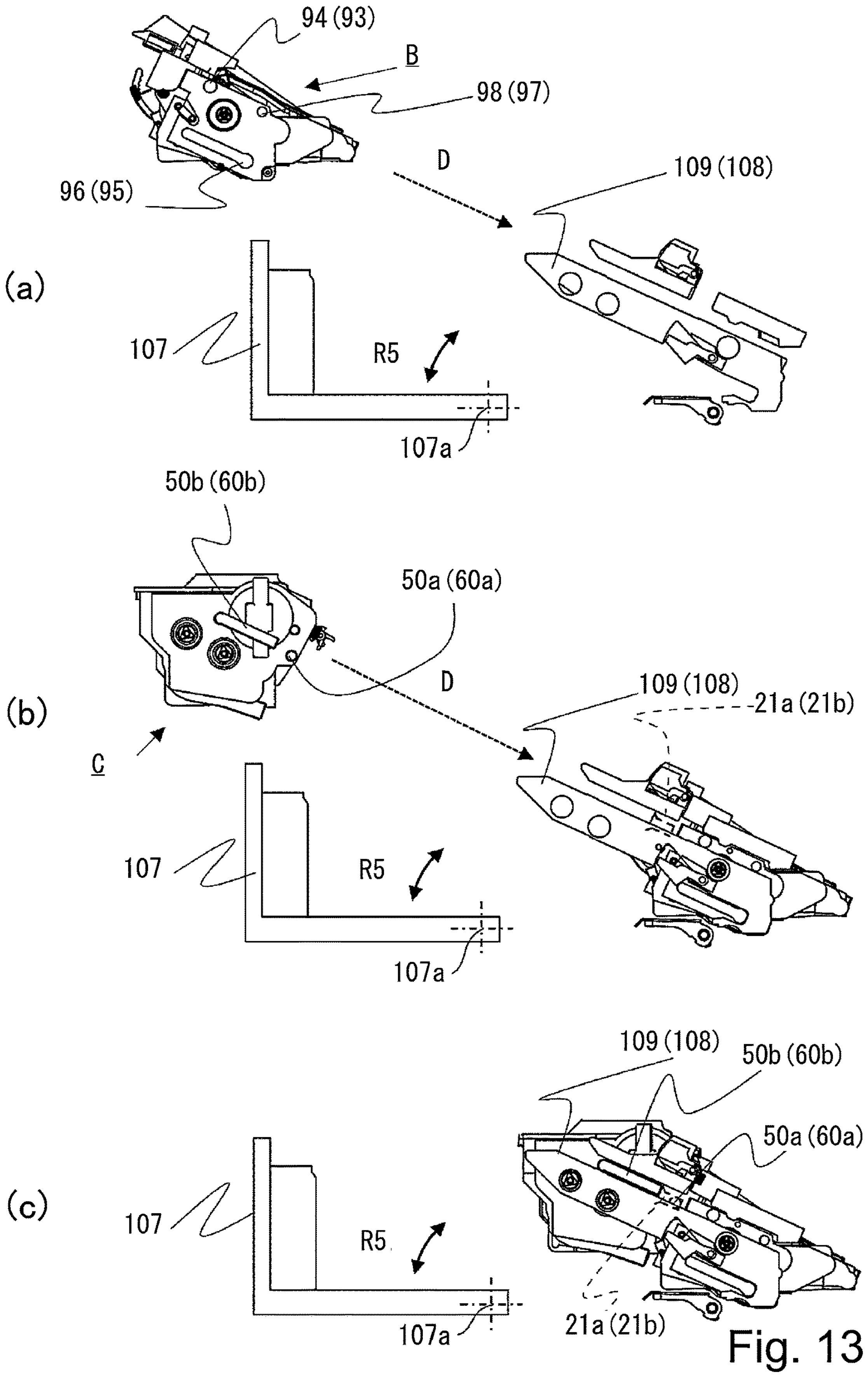

Part (a) of FIG. 13 is a schematic side view illustrating the inserting state of the process cartridge with respect to the main assembly, part (b) of FIG. 13 is a schematic side view illustrating the inserting state of the toner cartridge with respect to the main assembly, and part (c) of FIG. 13 is a schematic side view illustrating a state in which the process cartridge and the toner cartridge are mounted to the main assembly.

Figure 14:
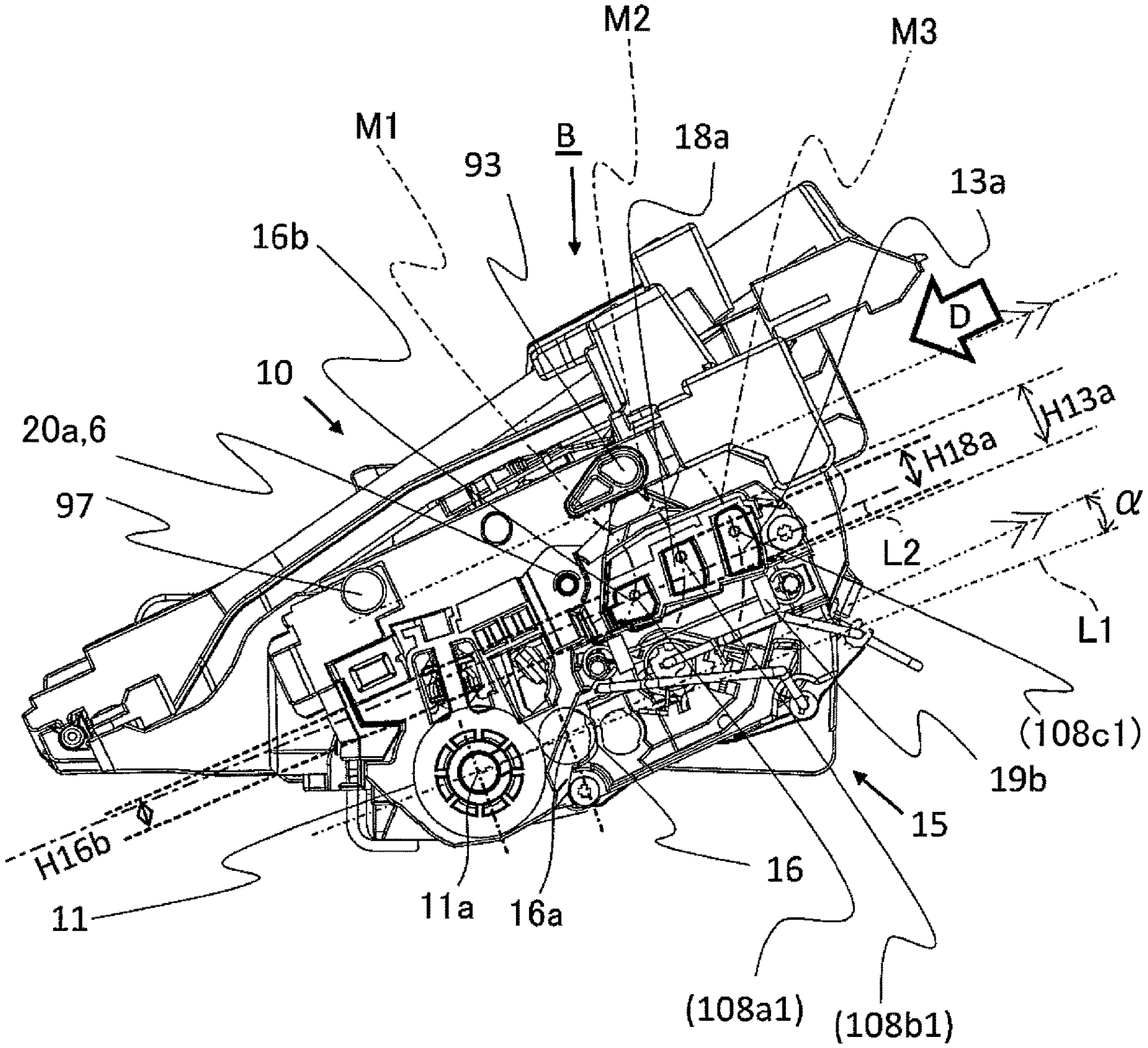

FIG. 14 is a side view of the process cartridge according to the Embodiment 1.

Figure 15:
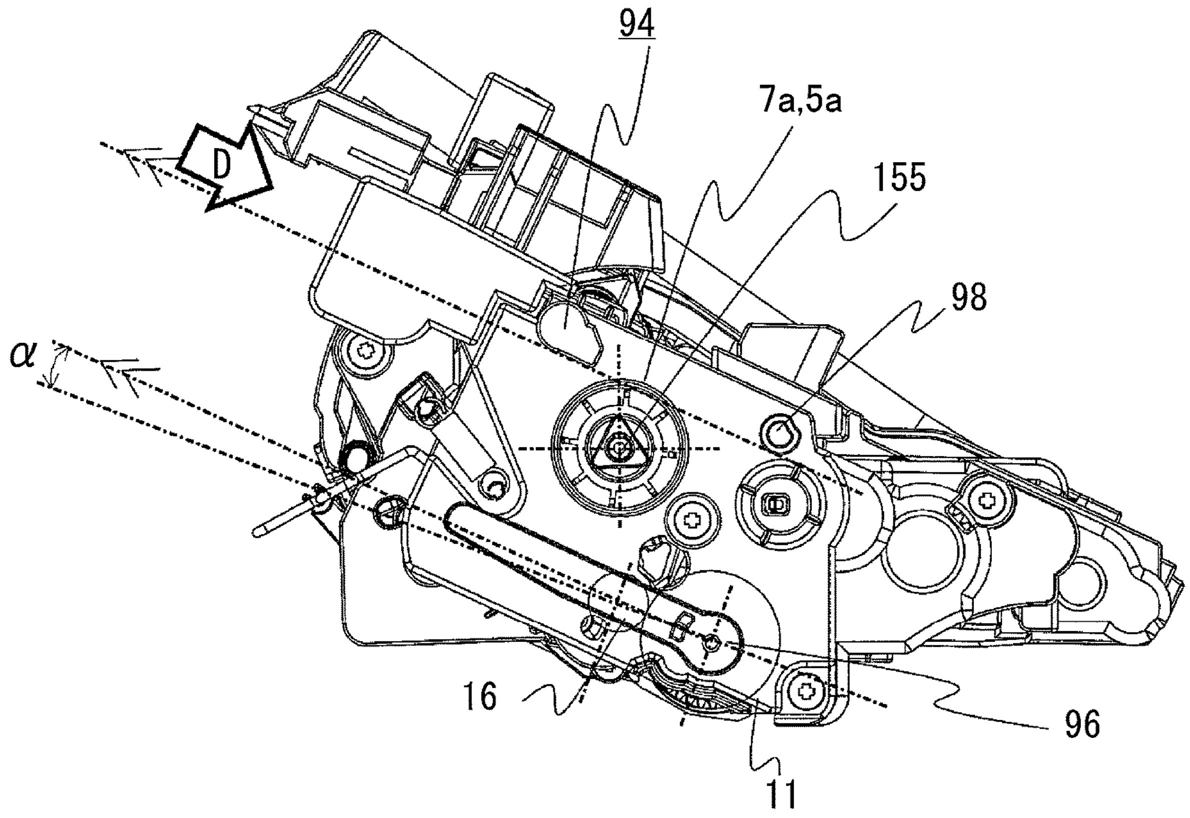

FIG. 15 is a side view of the process cartridge as seen in the opposite side of FIG. 14.

Figure 16:
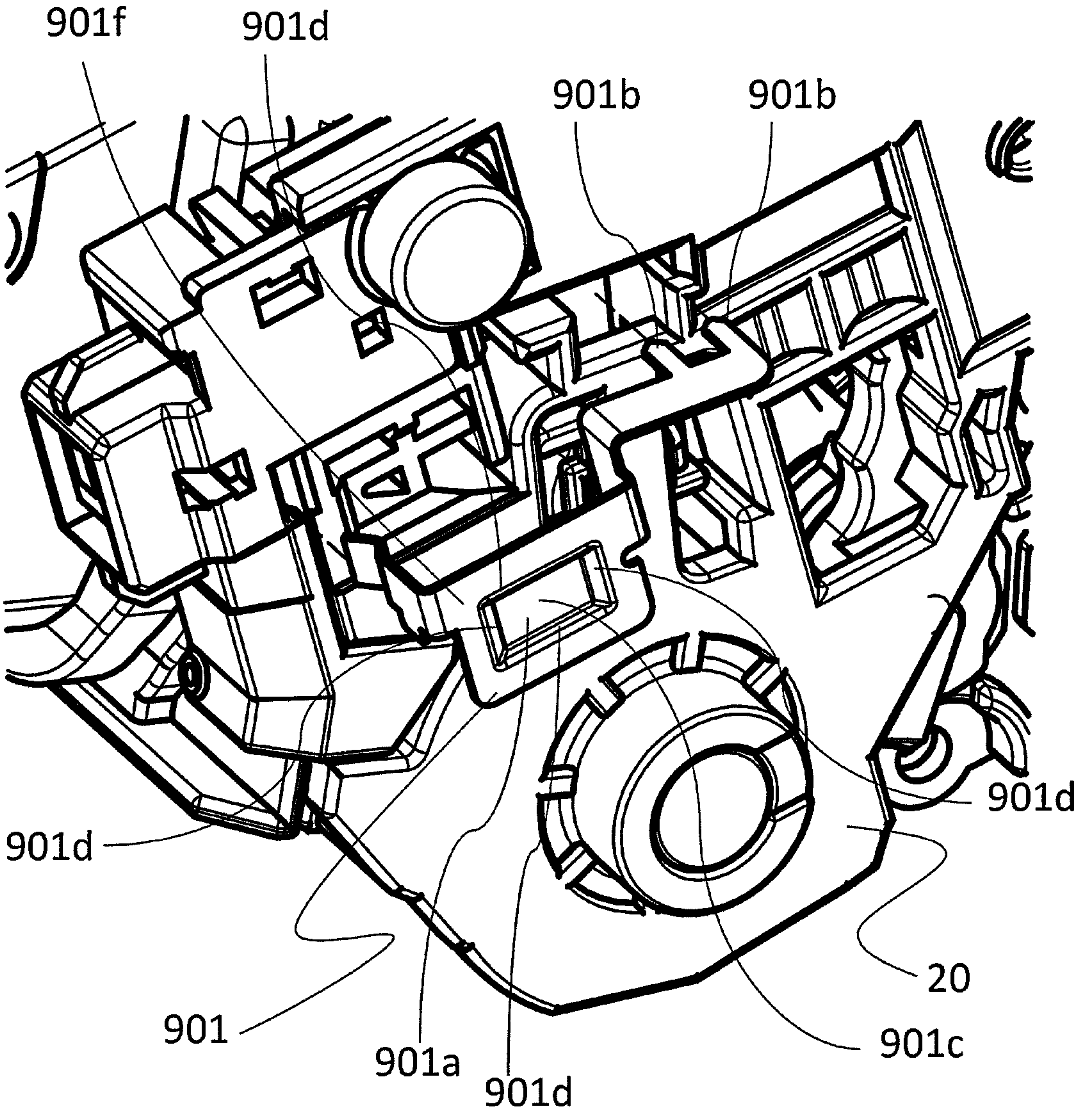

FIG. 16 is an exploded perspective view around an electrode member of the process cartridge according to the Embodiment 1.

Figure 17:
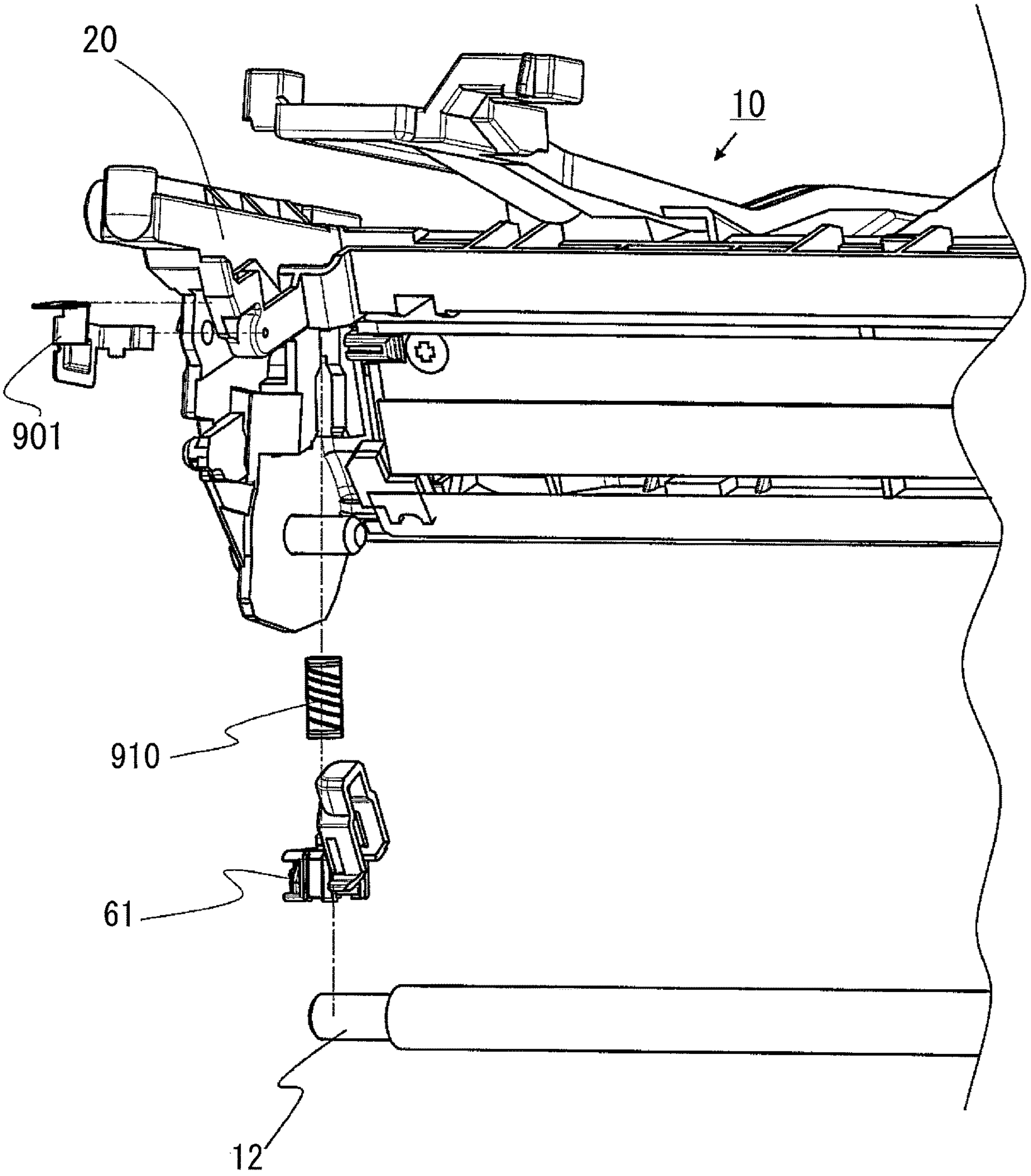

FIG. 17 is an exploded perspective view in which a part of a configuration around the electrode member of the process cartridge according to the Embodiment 1 is extracted and illustrated.

Figure 18:
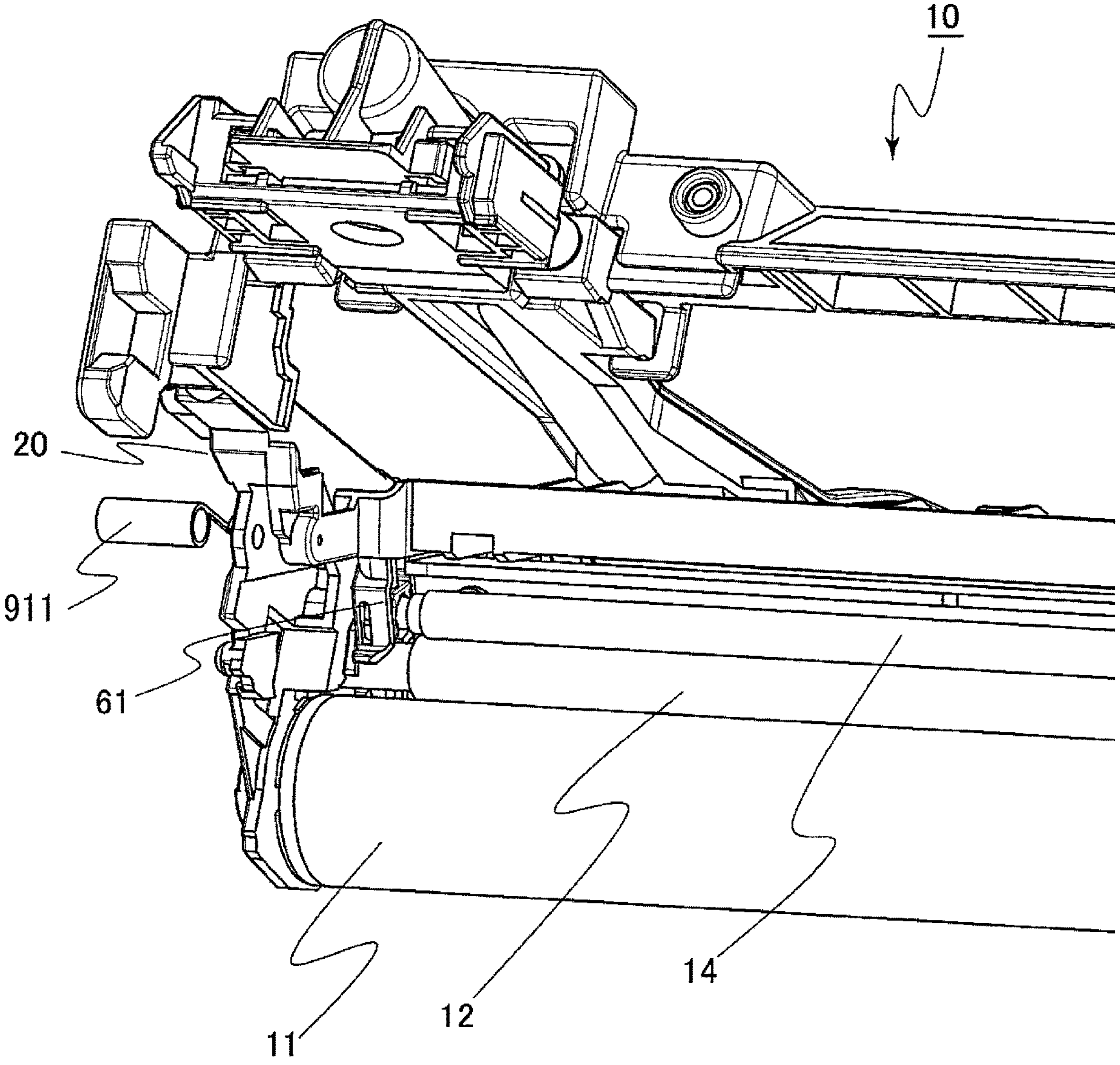

FIG. 18 is a perspective view in which the part of the configuration around the electrode member of the process cartridge according to the Embodiment 1 is extracted and seen in a charging roller side.

Figure 19:
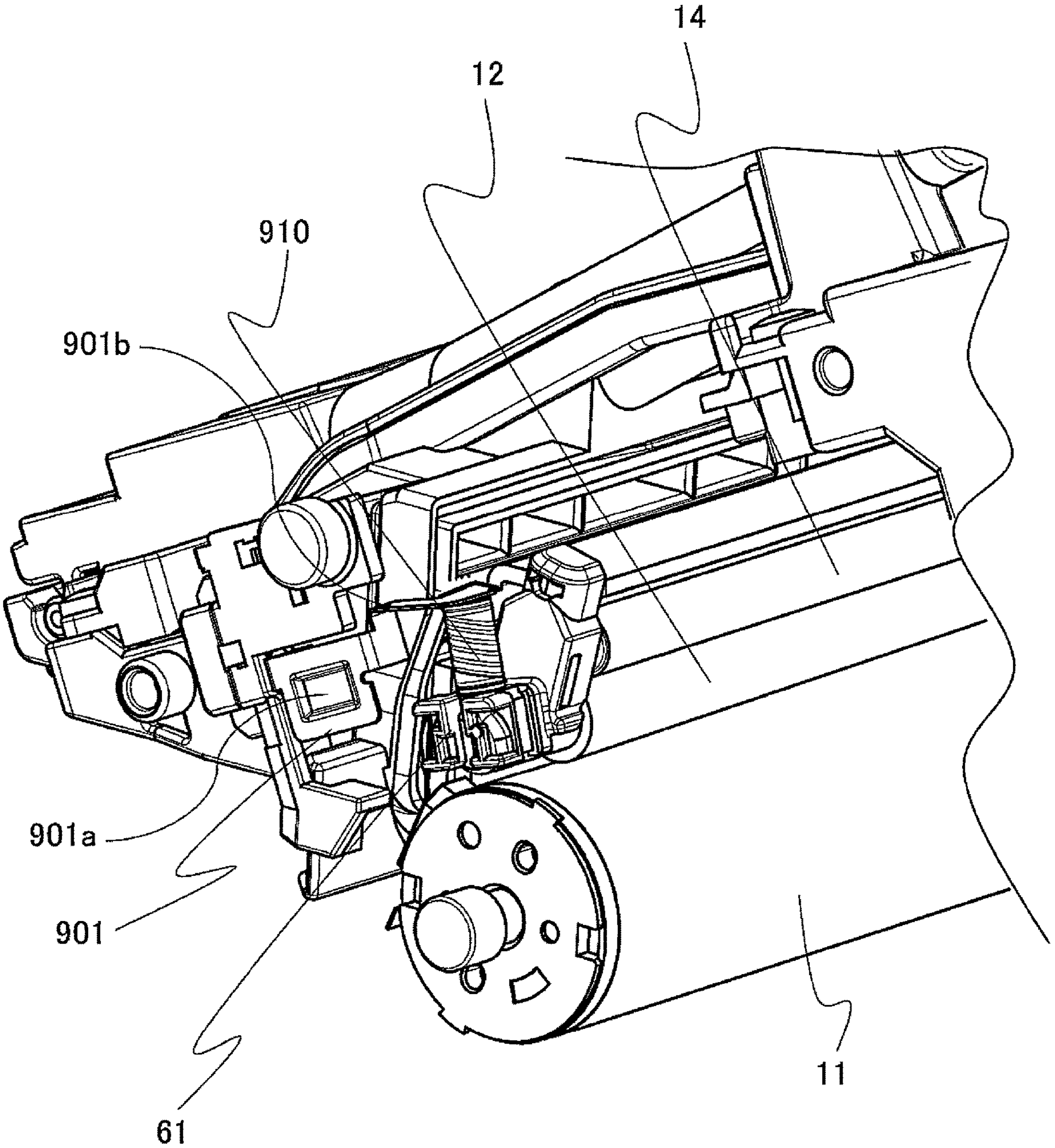

FIG. 19 is a perspective view in which the part of the configuration around the electrode member of the process cartridge according to the Embodiment 1 is extracted and seen in an electrode member side.

Figure 20:
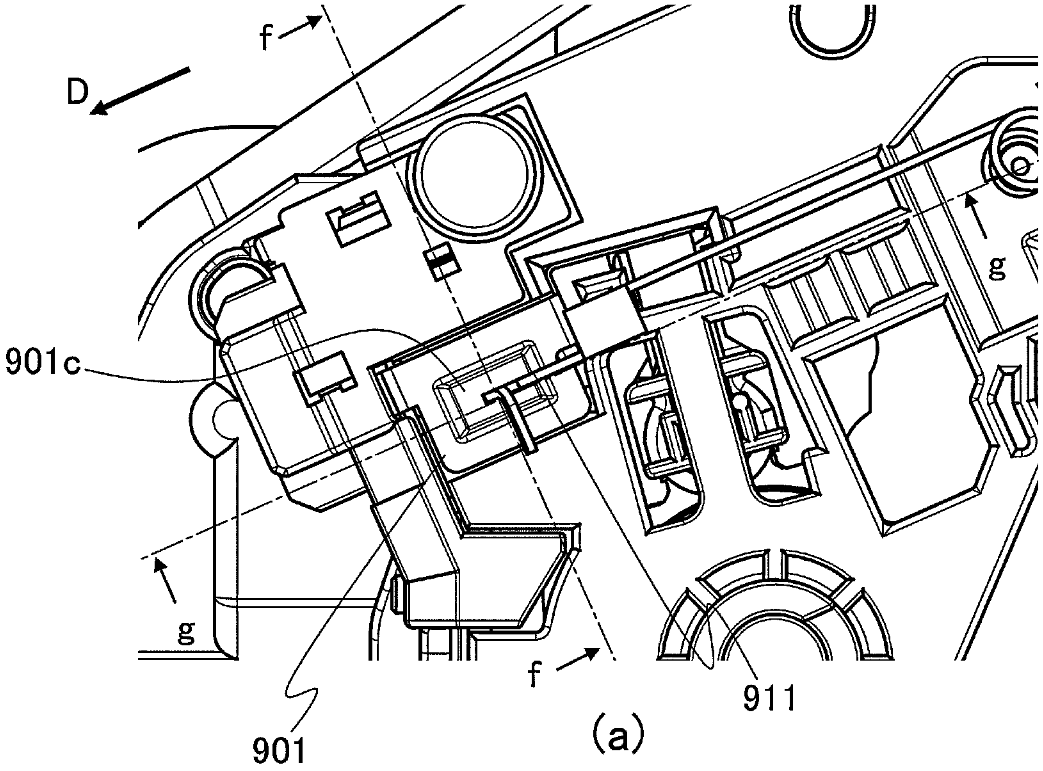
Figure 20:
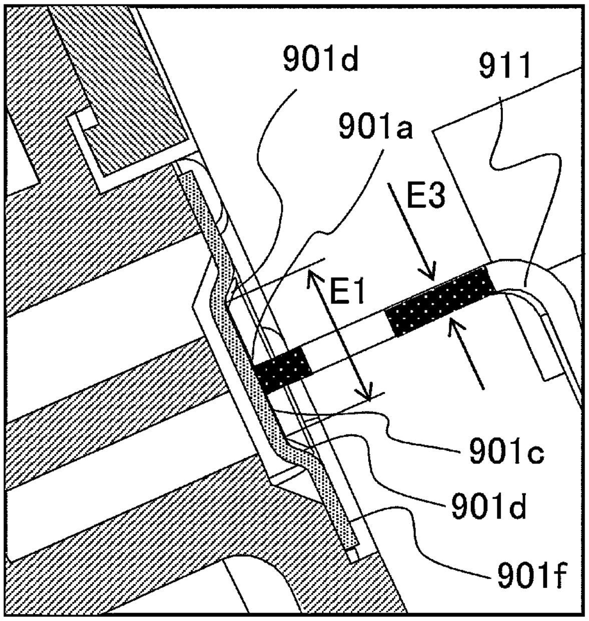
Figure 20:
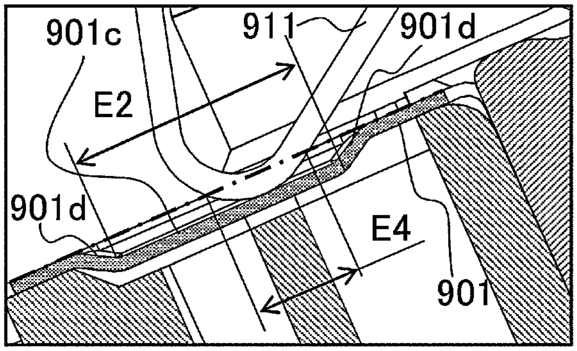

Part (a) of FIG. 20 is a front view illustrating relationship between the electrode member of the process cartridge and a spring contact of the main assembly according to the Embodiment 1, part (b) of FIG. 20 is an f-f cross-sectional view of part (a) of FIG. 20, and part (c) of FIG. 20 is a g-g cross-sectional view of part (a) of FIG. 20.

Figure 21:
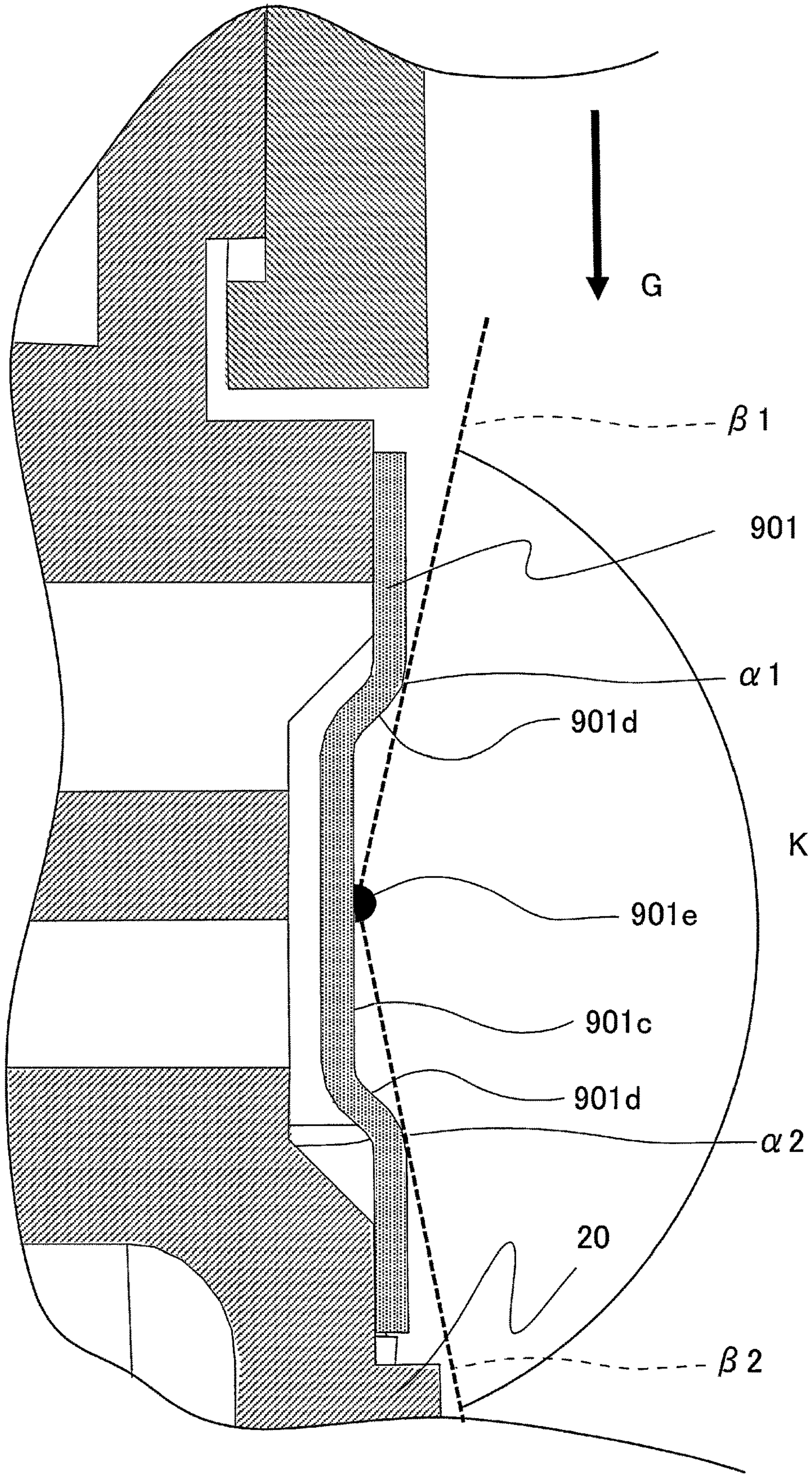

FIG. 21 is a cross-sectional view to describe a restricting area of sparks in the electrode member according to the Embodiment 1.

Figure 22:
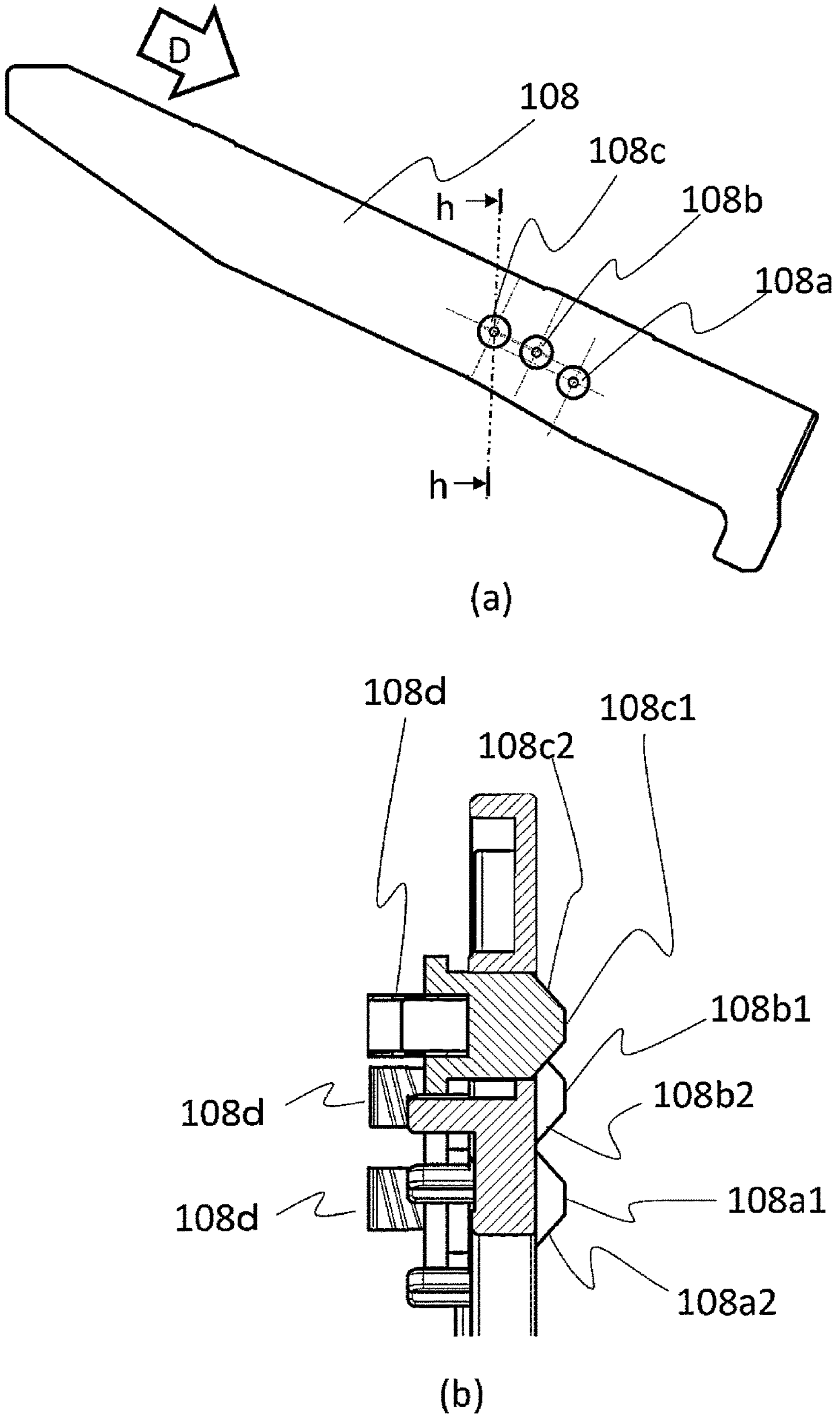

Part (a) of FIG. 22 is a front view in which a configuration around electrical contacts corresponding to electrical contacts of the developing unit of the process cartridge according to the Embodiment 1 is extracted, and part (b) of FIG. 22 is an h-h cross-sectional view of part (a) of FIG. 22.

Figure 23:
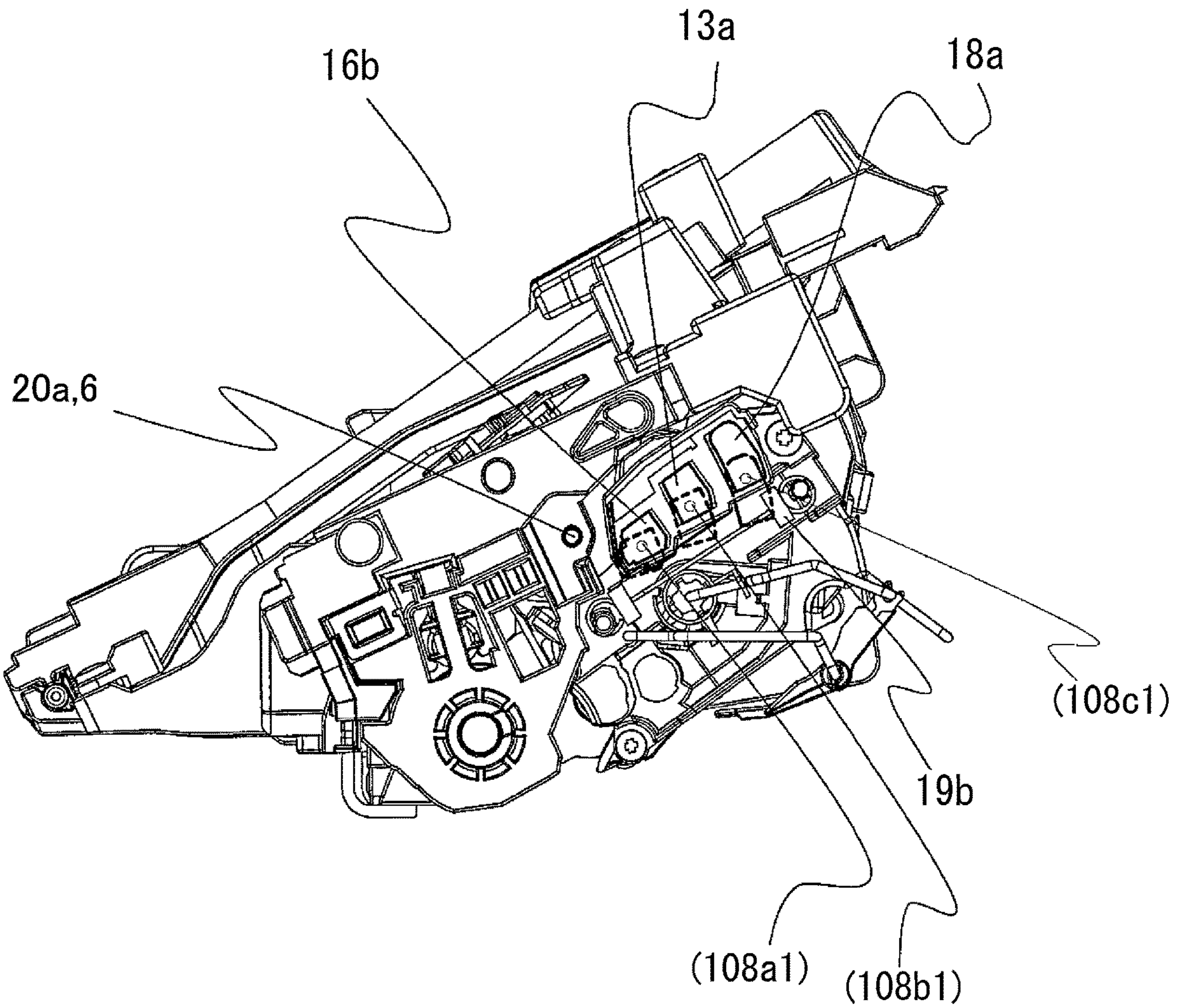

FIG. 23 is a side view of a state in which the photosensitive drum and a developing roller are separated in the process cartridge according to the Embodiment 1.

Figure 24:
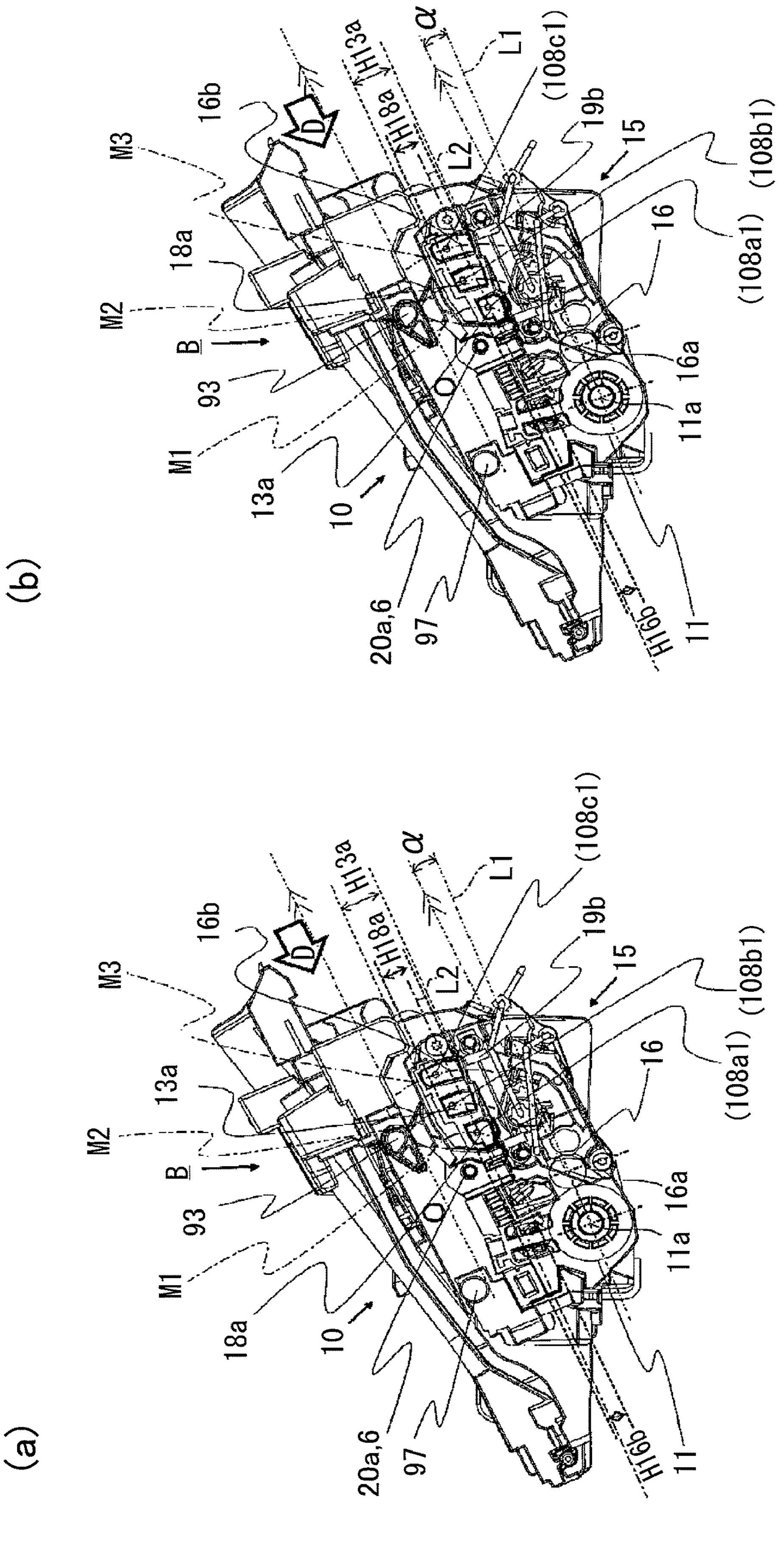

FIG. 24, part (a) and part (b), includes side views illustrating other states in which the photosensitive drum and the developing roller are separated in the process cartridge according to the Embodiment 1.

Figure 25:
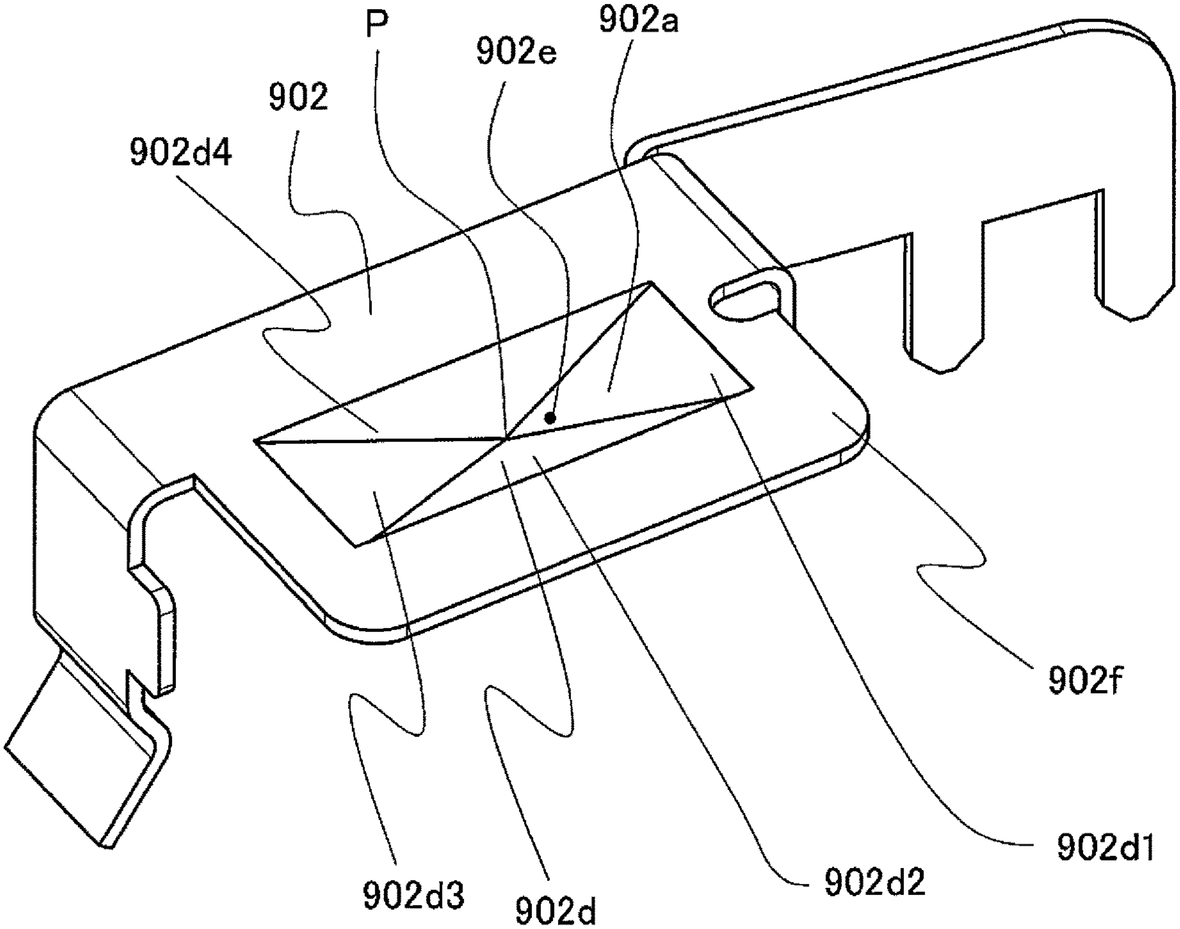

FIG. 25 is a perspective view of an electrode member according to an Embodiment 2.

EMBODIMENTS OF THE INVENTION

Embodiment 1

An Embodiment 1 will be described using FIG. 1 through FIG. 23. First, an overall configuration of an image forming apparatus of the present Embodiment will be described using FIG. 1.

Image Forming Apparatus

Figure 1:
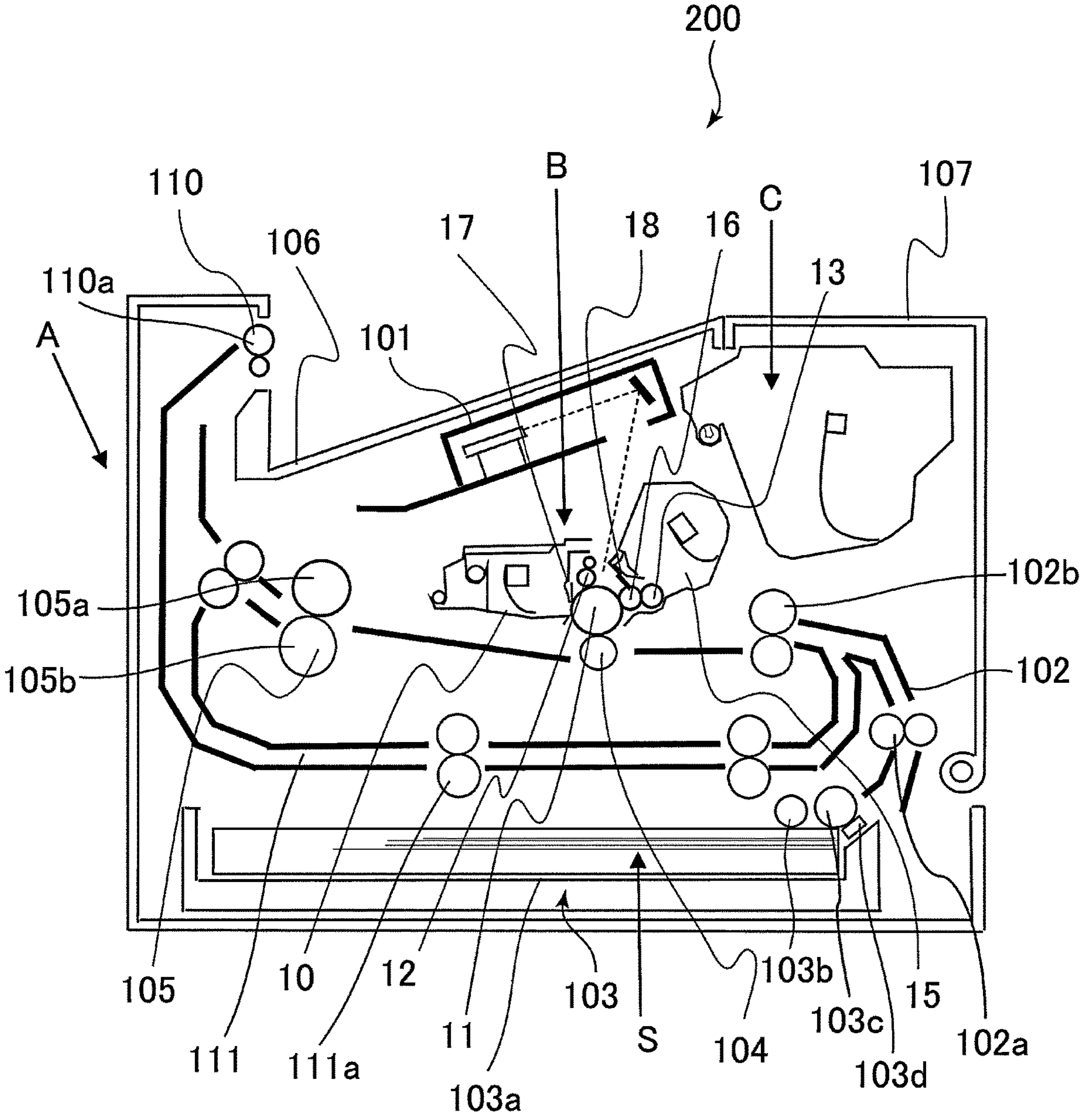
FIG. 1 is a cross-sectional view of an outline configuration of an image forming apparatus according to an Embodiment 1.

An image forming apparatus 200 of the present Embodiment is a laser printer of electrophotographic type. As shown in FIG. 1, the image forming apparatus 200 includes a main assembly (printer main assembly) A, a process cartridge B as an image forming portion and a toner cartridge C. In the main assembly A, a laser scanner 101, a sheet conveyance portion 102, a sheet feeding portion 103, a transfer roller 104, a fixing portion 105, a sheet discharging portion 110, and a reverse conveyance portion 111, etc. are disposed. In addition, though details will be described below, in the main assembly A, the process cartridge B and the toner cartridge C are disposed so as to be mountable thereto and demountable therefrom. Because of this, the main assembly A includes an opening/closing door 107.

The process cartridge B includes a photosensitive drum 11 as an image bearing member and a photosensitive member, a charging roller 12 as a charging member, a developing unit 15, and a cleaning blade 17 as a cleaning member. Above the process cartridge B, the laser scanner 101 as an exposure device is disposed.

The charging roller 12 is disposed so as to contact an outer peripheral surface of the photosensitive drum 11 and charges the photosensitive drum 11 by application of voltage from the main assembly A. In addition, the charging roller 12 is rotated following rotation of the photosensitive drum 11. The developing unit 15 is provided with a developing roller 16 as a developer carrying member which carries and conveys toner as developer. The developing roller 16 is disposed so as to be opposite to the photosensitive drum 11.

The cleaning blade 17 is a member which has elasticity and disposed so as to contact the outer peripheral surface of the photosensitive drum 11, and cleans a surface of the photosensitive drum 11. By a tip of the cleaning blade 17 elastically contacting the photosensitive drum 11, the cleaning blade 17 removes the toner remaining after a sheet S, which will be described below, passes through between the photosensitive drum 11 and the transfer roller 104 from the photosensitive drum 11.

The sheet feeding portion 103 includes a cassette 103*a*, a pickup roller 103*b*, which feeds uppermost sheets S accommodated in the cassette 103*a*, and a separating roller 103*c* and a separating pad 103*d*, which separate the sheets S fed by the pickup roller 103*b* into a single sheet. The sheet conveyance portion 102 includes a conveyance roller pair 102*a* and a registration roller pair 102*b*, which convey the sheet S fed from the sheet feeding portion 103. The registration roller pair 102*b* conveys the sheet S to a transfer portion between the photosensitive drum 11 and the transfer roller 104 in synchronization with a toner image formed on the photosensitive drum 11.

The fixing portion 105 includes a fixing roller 105*a*, which is heated by a heat source such as a heater, and a pressing roller 105*b*, which forms a fixing nip, in which the sheet is nipped between the pressing roller 105*b* and the fixing roller 105*a*. The sheet S, onto which the toner image is transferred in the transfer portion, is conveyed to the fixing portion 105, and heated and pressed in the fixing nip. By this, the toner image is fixed onto the sheet S.

The sheet discharging portion 110 includes a discharging roller pair 110*a*, and discharges the sheet S, onto which the toner image is fixed, with a discharging roller pair 110*a* to a discharge tray 106. The reverse conveyance portion 111 includes a reverse conveyance roller pair 111*a* and, in a case in which images are formed on both sides of the sheet S, reverses a front and a back of the sheet S, which has passed through the fixing portion 105, and conveys the sheet S toward the registration roller pair 102*b*.

Next, operation of the image forming apparatus 200 will be described using FIG. 1. The photosensitive drum 11, which is rotationally driven by an unshown driving source (motor), is uniformly charged to predetermined potential by the charging roller 12. To the photosensitive drum 11 after the charging, exposure based on image information is performed onto a surface thereof by the laser scanner 101, and by electric charge in an exposed area being removed, an electrostatic latent image is formed. By toner being supplied from the developing roller 16 to the electrostatic latent image on the photosensitive drum 11, the electrostatic latent image is visualized as the toner image.

Meanwhile, in parallel with such forming operation of the toner image, the sheet S is fed from the sheet feeding portion 103. The sheet S fed from the sheet feeding portion 103 is conveyed to the transfer portion by the registration roller pair 102*b* in synchronization with a timing when the toner image is formed on the photosensitive drum 11. Upon the sheet S passing through the transfer portion, voltage is applied to the transfer roller 104 from the main assembly A, and the toner image on the photosensitive drum 11 is transferred to the sheet S as an unfixed toner image. After that, the sheet S, onto which the toner image is transferred, is conveyed to the fixing portion 105, and the unfixed toner image is heated, pressed and fixed to a surface of the sheet S. The sheet S, to which the toner image is fixed, is discharged to the discharge tray 106 by the sheet discharging portion 110 and stacked thereon. Incidentally, in the case in which the images are formed on both sides of the sheet S, the sheet S is conveyed to the reverse conveyance portion 111, and the toner image is formed on a back surface of the sheet S in the same manner as described above.

Process Cartridge

Figure 2:
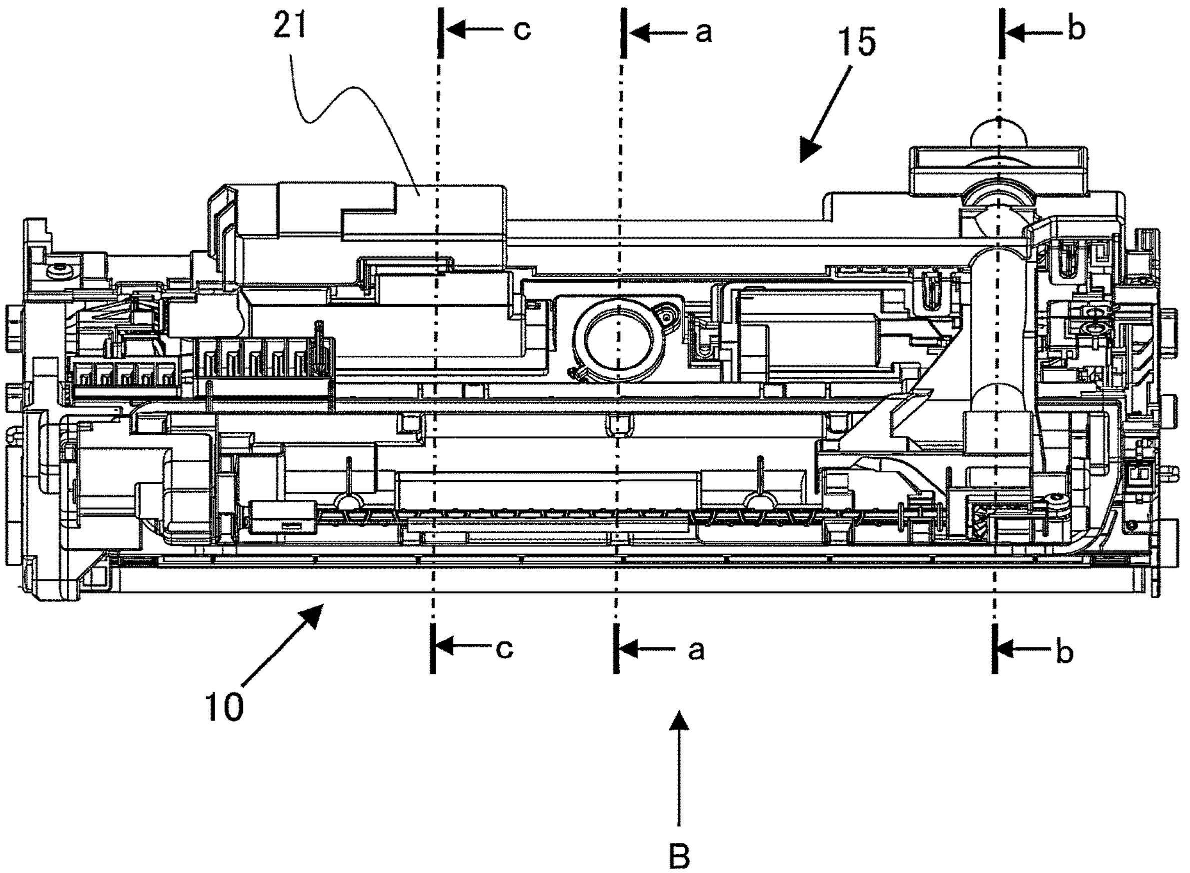
FIG. 2 is a front view of a process cartridge according to the Embodiment 1.
Figure 3:
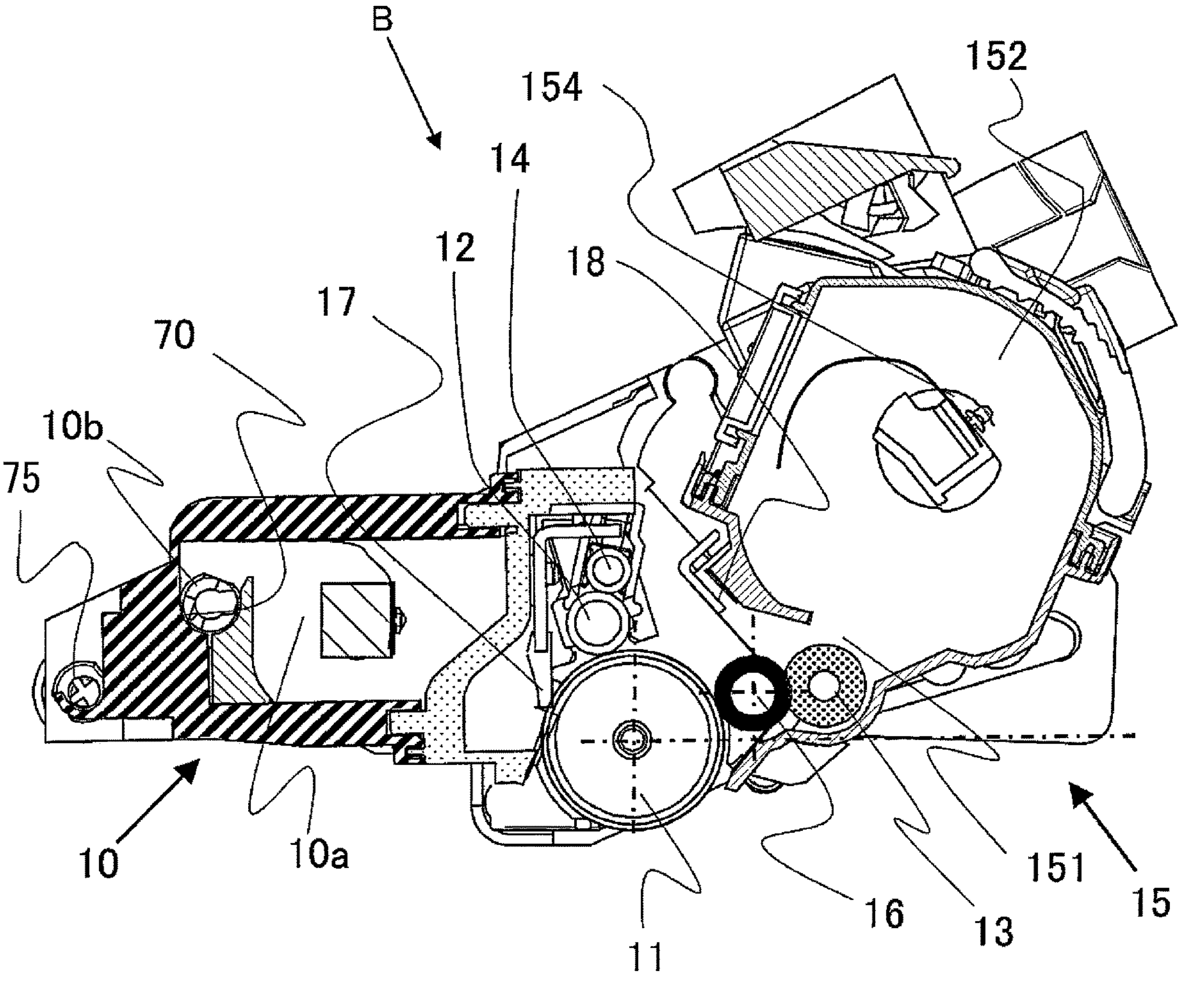
FIG. 3 is a a-a cross-sectional view of FIG. 2.
Figure 4:
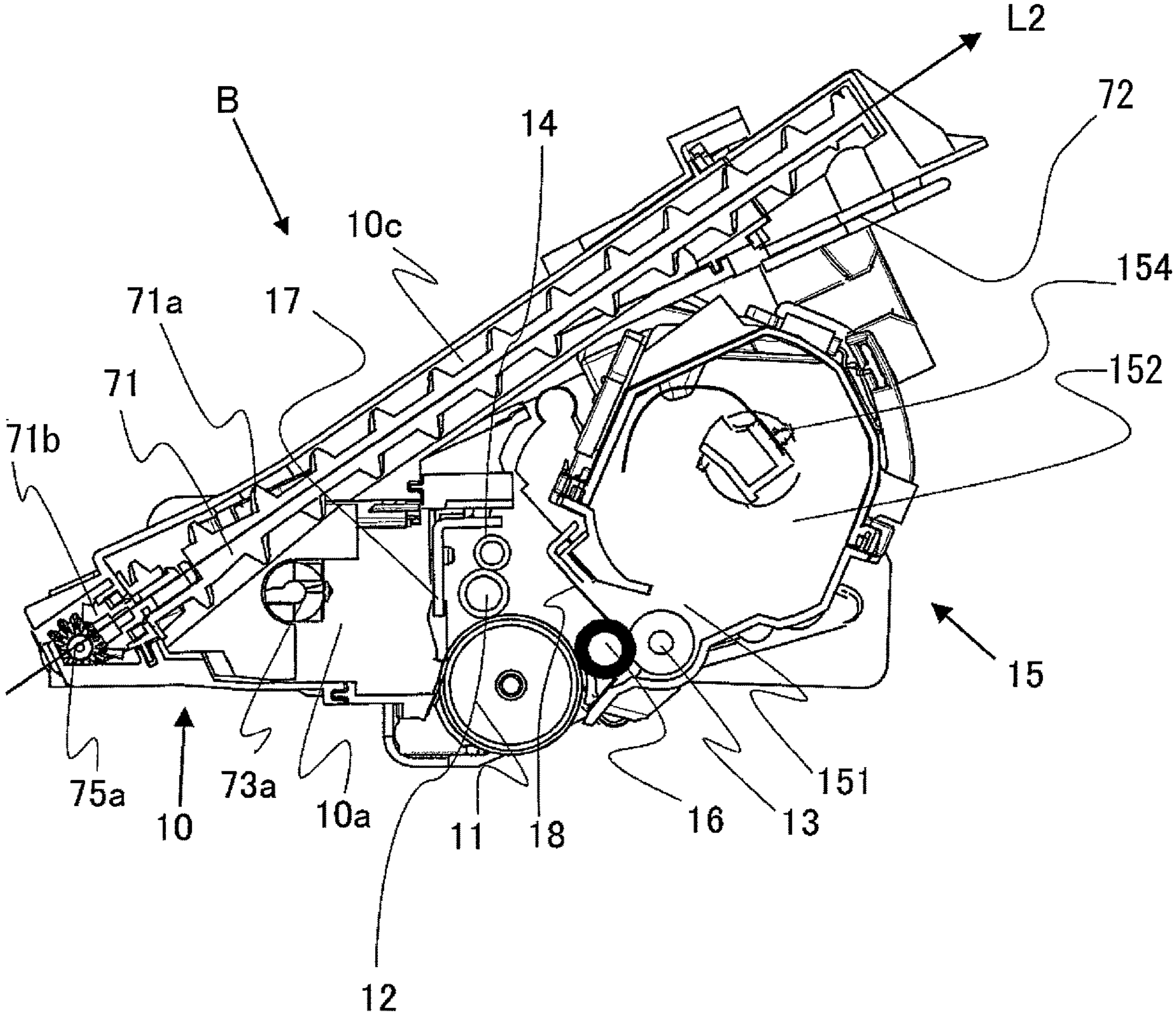
FIG. 4 is a b-b cross-sectional view of FIG. 2.

The process cartridge B will be described using FIG. 2 through FIG. 7. As illustrated in FIG. 2 through FIG. 4, the process cartridge B is constituted by a cleaning unit (first unit, drum unit) 10, which is provided with the photosensitive drum 11 and the cleaning blade 17, and the developing unit (second unit) 15, which is provided with the developing roller 16. The cleaning unit 10 includes the aforementioned photosensitive drum 11, the cleaning blade 17, the charging roller 12, a charging roller cleaner 14 as a cleaning member for the charging roller 12, a waste toner primary accommodating portion 10*a*, a first waste toner conveyance path 10*b* and a second waste toner conveyance path 10*c*. The toner (waste toner) removed from the photosensitive drum 11 by the cleaning blade 17 is conveyed from the waste toner primary accommodating portion 10*a* to the toner cartridge C through the first waste toner conveyance path 10*b* and the second waste toner conveyance path 10*c*.

Figure 5:
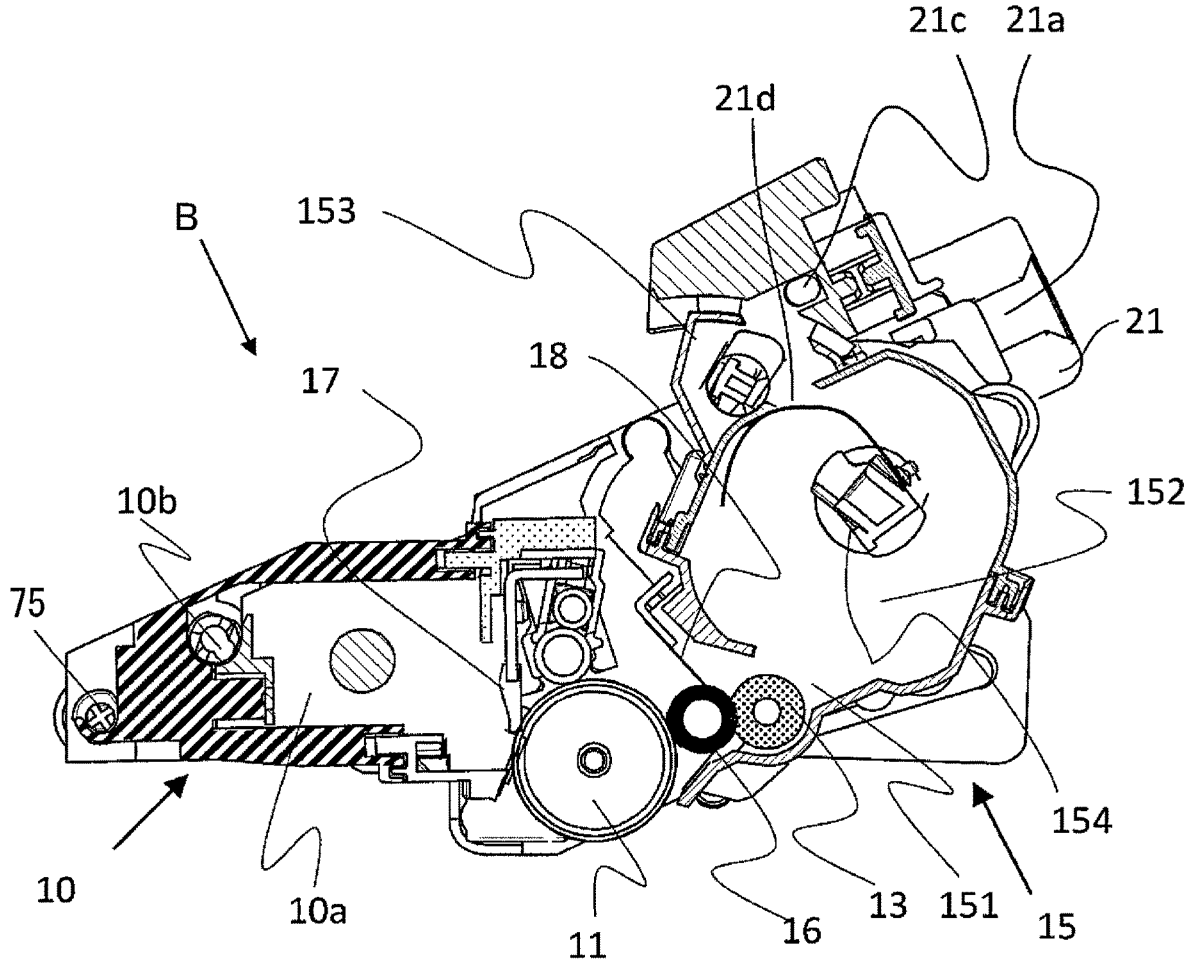
FIG. 5 is a c-c cross-sectional view of FIG. 2.

As shown in FIG. 5, the developing unit 15 includes a developing chamber 151, in which the developing roller 16, a supplying roller 13, a developing blade 18 and the developing roller 16 are disposed, a developer accommodating chamber 152, which supplies the toner to the developing chamber 151, and a toner receiving chamber 153, which receives the toner supplied from the toner cartridge C. The developing roller 16 is rotated with carrying the toner, and supplies the toner to a developing area of the photosensitive drum 11. And the developing roller 16, by using the toner, develops the electrostatic latent image formed on the photosensitive drum 11. The supplying roller 13 supplies the toner in the developing chamber 151 to the developing roller 16. Such supplying roller 13 is disposed so that a rotational axis direction thereof is parallel to a rotational axis direction of the developing roller 16, and, on an outer peripheral surface thereof, an elastic layer such as sponge is formed to facilitate conveyance of the developer. The developing blade 18 regulates a layer thickness (amount) of the toner adhered to (carried by) a peripheral surface of the developing roller 16 by being in contact with the peripheral surface of the developing roller 16. In addition, the developing blade 18 also applies frictional electric charge to the toner.

The developer accommodating chamber 152 communicates with the developing chamber 151 and accommodates the toner to be supplied to the developing chamber 151. The toner accommodated in the developer accommodating chamber 152 is moved to the developing chamber 151 by rotation of a stirring member 154 and is supplied to the developing roller 16. A remaining amount of the toner in the developer accommodating chamber 152 is detected by an unshown remaining amount detecting portion. And when the toner amount in the developer accommodating chamber 152 becomes a certain amount or less, the toner is supplied from the toner cartridge C to the process cartridge B.

The toner receiving chamber 153 communicates with the developer accommodating chamber 152 and supplies the toner replenished (supplied) from the toner cartridge C to the developer accommodating chamber 152. The toner supplied from the toner cartridge C to the developing unit 15 of the process cartridge B is performed via a supply port 21*c* of a stay 21, the toner receiving chamber 153 and a receiving and feeding port 21*d*, and the toner is accommodated in the developer accommodating chamber 152.

Next, using FIG. 3, part (a) and part (b) of FIG. 6, and part (a) and part (b) of FIG. 7, the configuration of the process cartridge B will be described in more detail. As mentioned above, the cleaning unit 10 includes the photosensitive drum 11, the charging roller 12 and the cleaning blade 17. Similarly, the developing unit 15 includes the developing roller 16, the developing blade 18, the developing chamber 151, the developer accommodating chamber 152 and the toner receiving chamber 153.

As shown in part (a) and part (b) of FIG. 6, the cleaning unit 10 is constituted by a cleaning frame 20, the stay 21 and a side cover 7. The cleaning frame 20 supports the cleaning blade 17, the charging roller 12 and the charging roller cleaner 14. As shown in part (b) of FIG. 6, one side of the photosensitive drum 11 is rotatably supported by a drum pin 22, which is attached to the cleaning frame 20, and the other side thereof is rotatably supported by a photosensitive drum supporting portion 7*b* provided to the side cover 7.

In addition, as shown in part (a) and part (b) of FIG. 6, in an end portion in the axial direction of the developing roller 16, bearing members 4 and 5 are disposed, and the developing unit 15 is connected to the cleaning unit 10 so as to be rotatable about a swing axis 8, which is defined by a straight line including supporting axes 8*a* and 8*b*. The swing axis 8 is disposed so as to be approximately parallel to a rotational axis 11*b* of the photosensitive drum 11.

A configuration in which the developing unit 15 is supported by the cleaning unit 10 will be described in detail. As shown in part (a) of FIG. 6, a cylindrical shape portion 5*a*, which is provided to the bearing member 5, is supported by a cylindrical hole portion 7*a*, which is provided to the side cover 7 of the cleaning unit 10. The supporting axis 8*a* is defined by a common axis of the cylindrical hole portion 7*a* of the side cover 7 and the cylindrical shape portion 5*a* of the bearing member 5. In addition, a developing coupling 155 as a drive inputting member to receive drive from the main assembly A is provided at a rotational center of the cylindrical shape portion 5*a* of the bearing member 5.

In addition, as shown in part (b) of FIG. 6, a pin 6 is inserted so as to straddle a cylindrical hole portion 20*a* of the cleaning frame 20 of the cleaning unit 10 and a cylindrical hole portion 4*a* of the bearing member 4. The supporting axis 8*b* is defined by a common axis of the pin 6 and the cylindrical hole portion 4*a* of the bearing member 4. The supporting axis 8*a* and the supporting axis 8*b* are disposed approximately coaxially, and the swing axis 8 is defined by the straight line including the supporting axis 8*a* and the supporting axis 8*b*, as described above.

As described above, the developing unit 15 is supported rotatably, with respect to the cleaning unit 10, about the swing axis 8. And the developing unit 15 is urged toward the photosensitive drum 11 of the cleaning unit 10 by pressing springs 19*a* and 19*b*, which are elastic members, and the developing roller 16 is in contact with the photosensitive drum 11.

Next, a contacting and separating operation of the developing unit 15 with respect to the cleaning unit 10 will be described using part (a) and part (b) of FIG. 7. Incidentally, part (a) and part (b) of FIG. 7 are explanatory views in which the side cover 7 is omitted to show a separating mechanism 100 of the main assembly A. As shown in part (a) of FIG. 7, a projecting portion 5*b* is provided at a position opposite to the separating mechanism 100 of the bearing member 5. In the present Embodiment, in a state in which the process cartridge B is mounted to the main assembly A, the separating mechanism 100 is provided below the developing unit 15. And the projecting portion 5*b* is provided at a lower end portion of the bearing member 5. The separating mechanism 100 is provided to the main assembly A and is configured to be swingable in an approximately vertical direction about a swing shaft 100*a* by an unshown driving source such as a motor.

As shown in part (a) of FIG. 7, in a position in which the projecting portion 5*b* is not in contact with the separating mechanism 100, the developing roller 16 is in contact with the photosensitive drum 11 by urging force of the pressing springs 19*a* and 19*b*. This position is an image forming position in which the electrostatic latent image formed on the surface of photosensitive drum 11 can be developed by the developing roller 16.

As shown in part (b) of FIG. 7, by the separating mechanism 100 provided to the main assembly A being swinged about the swing shaft 100*a* and being in contact with the projecting portion 5*b*, and by the projecting portion 5*b* receiving force from the separating mechanism 100, the developing unit 15 is rotated in a direction of an arrow R2 about the swing axis 8 as a rotation center. As a result, the developing roller 16 is separated from the photosensitive drum 11 against the urging force of the pressing springs 19*a* and 19*b*. This position is a non-image forming position retracted from the image forming position.

When the separating mechanism 100 returns from the position of part (b) of FIG. 7 to the position of part (a) of FIG. 7, which is an original position, the separating mechanism 100 is separated from the projecting portion 5*b*. And the developing roller 16 is in contact with the photosensitive drum 11 again by the urging force of the pressing spring 19*a* and the pressing spring 19*b*. In this manner, in the present Embodiment, it becomes possible to switch the position of the developing unit 15 between the contact position (image forming position) and the separated position (non-image forming position) by the separating mechanism 100. That is, a posture of the developing unit 15 in the process cartridge B can be switched, with respect to the photosensitive drum 11, between the contact position and the separated position. By this, it becomes possible to suppress deterioration of the toner and unnecessary consumption of the toner during non-image formation.

As described above, the developing unit 15 is configured to move, with respect to the cleaning unit 10, between the contact position and the separated position by being rotated about the swing axis 8. Therefore, upon the developing unit 15 moving between the contact position and the separated position with respect to the cleaning unit 10, a positional change of the developing coupling 155 can be suppressed to as small as fitting play. Specifically, when the cylindrical shape portion 5*a* of the bearing member 5 engages the cylindrical hole portion 7*a* of the side cover 7 (part (a) of FIG. 6), the cylindrical shape portion 5*a* of the bearing member 5 and the cylindrical hole portion 7*a* of the side cover 7 are engaged with fitting play within 0.13 mm. Therefore, the position of the developing coupling 155 upon the developing unit 15 moving between the contact position and the separated position does not change more than the fitting play.

Toner Cartridge

Next, the toner cartridge C will be described using FIG. 8 through FIG. 11. As shown in FIG. 8, the toner cartridge C is provided with a toner supplying unit 30 and a waste toner accommodating unit 40. The toner cartridge C is mountable and demountable with respect to the main assembly A together with the process cartridge B, and also mountable and demountable with respect to the process cartridge B. The toner supplying unit 30 is capable of supplying the toner to the process cartridge B. The waste toner accommodating unit 40 is capable of accommodating the waste toner collected by the process cartridge B.

Toner Supplying Unit

The toner supplying unit 30 includes, as shown in FIG. 9, a toner supplying container 31 as a first accommodating container, in which the toner is accommodated, and a toner outlet 31*a* for discharging the toner from the toner supplying container 31 to an outside thereof. The toner supplying container 31 is formed by a supplying portion frame 32*a*, which includes a toner accommodating portion 30*a*, and a supplying portion lid 32*b*. In addition, to the supplying portion frame 32*a*, the toner outlet 31*a* for discharging the toner from the toner accommodating portion 30*a* is provided. In addition, a shutter member 34, which is capable of opening/closing the toner outlet 31*a*, is provided. The shutter member 34 opens/closes the toner outlet 31*a* by being rotated in a direction of an arrow R1 in interrelation with a mounting/demounting operation of the toner cartridge C with respect to the process cartridge B. The shutter member 34 is disposed outside of the supplying portion frame 32*a*.

In addition, the toner accommodating portion 30*a* includes a toner accommodating portion screw member 35, which conveys the toner toward the toner outlet 31*a* as a toner conveyance member which conveys the toner toward the toner outlet 31*a*. In addition, the toner accommodating portion 30*a* includes a toner accommodating portion stirring and conveying unit 36 which conveys the toner toward the toner accommodating portion screw member 35.

In addition, as shown in part (a) and part (b) of FIG. 11, the toner conveyed to the toner outlet 31*a* is discharged out of the toner outlet 31*a* by volume of a pump 37*a* provided to a pump unit 37. The pump unit 37 is constituted by the pump 37*a*, of which volume is changed by being extended and retracted, a cam 37*b*, which extends and retracts the pump 37*a* by rotation thereof, and a link arm 37*c*. In addition, as shown in FIG. 7 and part (a) and part (b) of FIG. 11, the toner supplying unit 30 includes, as a toner conveyance driving portion which drives the toner conveyance portion, a stirring drive inputting portion 38, which drives the toner accommodating portion stirring and conveying unit 36, and a pump and screw drive inputting portion 39, which drives the pump unit 37 and the toner accommodating portion screw member 35.

In the pump and screw drive inputting portion 39, rotational driving force is input from the main assembly A to a pump and screw coupling portion 39*a*, which has a projecting shape. This rotational driving force is converted into reciprocating motion by the cam 37*b* and the link arm 37*c*. And by using the reciprocating motion to expand and contract a bellows shape of the pump 37*a*, the volume change is obtained.

Waste Toner Accommodating Unit

As shown in FIG. 10, the waste toner accommodating unit 40 includes a waste toner receiving port 42 for receiving the waste toner from the process cartridge B and a waste toner accommodating container 41 as a second accommodating container in which the waste toner received from the waste toner receiving port 42 is accommodated.

The waste toner accommodating container 41 is constituted by a waste toner accommodating portion frame 41*a*, which includes a waste toner accommodating portion 40*a*, and a waste toner accommodating lid 41*b*. To the waste toner accommodating lid 41*b*, the waste toner receiving port 42, which receives the waste toner collected from the process cartridge, is provided. The waste toner accommodating lid 41*b* includes a waste toner shutter member 43, which opens/closes the waste toner receiving port 42. The waste toner shutter member 43 opens/closes in a direction of an arrow R3 in FIG. 10 in interrelation with the mounting and demounting of the toner cartridge C with respect to the main assembly A.

As shown in FIG. 10 and part (a) of FIG. 11, in the waste toner accommodating unit 40, a partition member 46, a first waste toner accommodating screw 44 and a second waste toner accommodating screw 45 as waste toner conveyance members which convey the waste toner in the waste toner accommodating portion 40*a*. The partition member 46 divides a space inside the waste toner accommodating unit 40 into a plurality of accommodating portions. The first waste toner accommodating screw 44 conveys the waste toner, which is fallen from the waste toner receiving port 42, in a longitudinal direction of the toner cartridge C. The second waste toner accommodating screw 45 receives drive from the first waste toner accommodating screw 44 and conveys the waste toner, which is conveyed by the first waste toner accommodating screw 44, diagonally above.

As shown in part (a) and part (b) of FIGS. 11, the driving force input from the aforementioned stirring drive inputting portion 38 is transmitted to a non-driving side of the toner supplying unit 30 via the toner accommodating portion stirring and conveying unit 36, and is transmitted to a toner accommodating portion stirring member non-driving side gear 38*a*. From the toner accommodating portion stirring member non-driving side gear 38*a*, by a waste toner accommodating portion gear train 47, the drive is transmitted to the first waste toner accommodating screw 44. To the toner supplying unit 30 side, a driving side toner cartridge side cover 50 is attached, and to the waste toner accommodating unit 40 side, a non-driving side toner cartridge side cover 60 is attached.

By the above configuration, even when the pump and screw drive inputting portion 39 is not driven, the stirring drive inputting portion 38 can be driven. That is, even when the toner supplying unit 30 is not replenishing (supplying) the toner to the process cartridge B, by driving the first waste toner accommodating screw 44 and the second waste toner accommodating screw 45 in the waste toner accommodating unit 40, it becomes possible to maintain a waste toner collectable state.

In addition, since it becomes possible to unify input of the drive from the main assembly A to one end of the toner cartridge C, it becomes possible to simplify gear trains of the main assembly A. In addition, by using the toner accommodating portion stirring and conveying unit 36, by transmitting the drive from one end of the supplying portion frame 32*a* to the other end thereof, it becomes possible to transmit the drive to the waste toner accommodating unit 40 without increasing a number of components for drive transmission. By this, it becomes possible to accommodate the waste toner in the toner cartridge C while suppressing an increase in sizes of the toner cartridge C and the main assembly A in the rotational axis direction of the photosensitive drum 11 due to driving means of the toner cartridge C.

Mounting and Demounting Method for the Process Cartridge B and the Toner Cartridge C Next, a mounting and demounting method for the process cartridge B and the toner cartridge C with respect to the main assembly A will be described using FIG. 6, part (a) and part (b) of FIG. 11, part (a) and part (b) of FIG. 12, part (a) through part (c) of FIG. 13, FIG. 14 and FIG. 15. As shown in part (a) of FIG. 12, an inner space of the main assembly A is a mounting portion for the process cartridge B and the toner cartridge C. The opening/closing door 107 is provided so as to be rotatable about a rotational axis 107*a* in a direction of an arrow R5 with respect to the main assembly A (see part (a), part (b) and part (c) of FIG. 13). Part (a) of FIG. 12 is a view of a state in which the opening/closing door 107 is opened.

In addition, the main assembly A includes a guide portion 108 and a guide portion 109. The guide portion 108 and the guide portion 109 are provided, on both sides in the longitudinal direction of the process cartridge B and the toner cartridge C in a mounted state, along a mounting direction D of the process cartridge B and the toner cartridge C. As shown in FIG. 6, FIG. 14, and FIG. 15, to the process cartridge B, upper bosses 93 and 94 and lower bosses 95 and 96 are provided on both sides in the longitudinal direction thereof, and leading end bosses 97 and 98 are provided on a downstream side of the mounting direction of the upper bosses 93 and 94.

The mounting of the process cartridge B and the toner cartridge C to the main assembly A is performed from the process cartridge B. First, upon mounting the process cartridge B to the main assembly A, as shown in part (a) of FIG. 12 and part (a) of FIG. 13, the upper boss 93 and the leading end boss 98 ride on the guide portion 108, and with those two points and the lower boss 96, the guide portion 108 is sandwiched. On the opposite side in the longitudinal direction of the process cartridge B, the upper boss 93 and the leading end boss 97 ride on the guide portion 109 in the same manner, and with those two points and the lower boss 95, the guide portion 109 is sandwiched. As such, by inserting the process cartridge B while sandwiching the guide portions 108 and 109 with the upper bosses 93 and 94, the leading end bosses 97 and 98, and the lower bosses 95 and 96, the process cartridge B is guided into the mounting portion inside the main assembly A by the guide portions 108 and 109.

It will be described in more detail. The mounting direction D of the process cartridge B is, as shown in FIG. 14, a direction of a line connecting a lower end of the leading end boss 97 and a lower end of the upper boss 93. When a user mounts the process cartridge B to the main assembly A with the process cartridge B in a lifted posture with the leading end boss 97 (98) as a pivoting point, the posture of the process cartridge B is restricted by the lower boss 96 (95) hitting the guide portion 109 (108). A shifted amount between a direction at this moment and the mounting direction D is as much as a play between the guide portion 109 (108) and the lower boss 96 (95).

When a user mounts the process cartridge B to the main assembly A with the process cartridge B in a lifted posture with the upper boss 94 (93) as a pivoting point, the posture of the process cartridge B is restricted by the lower boss 96 (95) hitting the guide portion 108 (109). A shifted amount between a direction at this moment and the mounting direction D is as much as a play between the guide portion 108 (109) and the lower boss 96 (95).

As described above, the mounting direction D has some leeway in an angle depending on the mounting method of a user. In the present Embodiment, as shown in FIG. 14, as another way of showing the mounting direction D, the mounting direction D is stipulated as a direction, in a state in which the photosensitive drum 11 is in contact with the developing roller 16, of which an angle $\alpha$ formed with a line connecting centers of axes of the photosensitive drum 11 and the developing roller 16 becomes $3.8° \pm 5°$.

As shown in part (a) and part (b) of FIG. 11, the toner cartridge C includes positioning bosses 50*a* and 60*a* on both sides in the longitudinal direction thereof on a front side of the mounting direction D (upstream side of the mounting direction). In addition, the toner cartridge C includes, on both sides in the longitudinal direction thereof, guided portions 50*b* and 60*b*, on a back side of the mounting direction D (downstream side of the mounting direction) from the positioning bosses 50*a* and 60*a*. The positioning boss 50*a* and the guided portion 50*b* are provided to an end surface of the driving side toner cartridge side cover 50 on an outside in an axial direction E. The positioning boss 60*a* and the guided portion 60*b* are provided to an end surface of the non-driving side toner cartridge side cover 60 on an outside in the axial direction E. As shown in part (a) and part (b) of FIG. 6, the process cartridge B includes toner cartridge positioning portions 21*a* and 21*b* in the stay 21.

As shown in part (b) of FIG. 12 and part (b) of FIG. 13, upon mounting the toner cartridge C to the main assembly A, the toner cartridge C is mounted in the mounting direction D with the guided portions 50*b* and 60*b* being placed on the guide portion 108 and the guide portion 109, respectively. As shown in part (c) of FIG. 13, when the toner cartridge C is mounted to a mounting completed position, the positioning bosses 50*a* and 60*a* of the toner cartridge C enter the toner cartridge positioning portions 21*a* and 21*b* of the process cartridge B. At this time, leading end sides in the mounting direction of the guided portions 50*b* and 60*b* are away from the guide portion 108 and the guide portion 109, and trailing ends thereof are in a state of being in contact with the guide portion 108 and the guide portion 109. By this, the toner cartridge C is positioned with respect to the process cartridge B. In addition, by the trailing ends of the guided portions 50*b* and 60*b* being in contact with the guide portion 108 and the guide portion 109, a position of the toner cartridge C in the main assembly A is determined.

After the mounting of the process cartridge B and the toner cartridge C, when the opening/closing door 107 is closed, the image forming apparatus 200 becomes a state capable of the image formation. Upon demounting the toner cartridge C and the process cartridge B, it is performed through the reverse procedure.

Charging Contact Configuration of the Process Cartridge

Next, details of a charging contact configuration of the process cartridge B in the present Embodiment will be described using FIG. 16 through FIG. 21. As shown in FIG. 16 and FIG. 17, to the cleaning unit 10, the cleaning frame 20 as a frame and the charging roller 12 as a process member and a charging member are provided. The process member is a member which is used in the image formation, and the charging roller 12 is a rotatable member which is rotatably supported by the cleaning frame 20 and is used in the image formation. In addition, the cleaning frame 20 is constituted by a resin material, and in the present Embodiment, is constituted by a resin material of which a flame retardancy based on UL94 standard is HB.

As shown in FIG. 17 and FIG. 18, a charging roller bearing 61 is connected to the cleaning frame 20 via a charging roller bearing spring 910, and the charging roller 12 is rotatably supported by the cleaning frame 20 via the charging roller bearing 61. The charging roller 12, by being rotated while predetermined bias is applied thereto, uniformly charges the surface of the photosensitive drum 11.

As shown in FIG. 16 and FIG. 19, the cleaning unit 10 includes an electrode plate 901 as an electrode member made of metal in order to apply the predetermined bias to the charging roller 12. The electrode plate 901 includes, as shown in part (a) through part (c) of FIG. 20, a conductive connecting portion 901*b*, which is electrically connected to the charging roller 12, and a contact portion (contacting portion) 901*a* as an electrical contact portion, which is electrically connected to a spring contact 911 as a main assembly side electrode member provided to the main assembly side.

The contact portion 901*a* is provided so as to be exposed to outside of the cleaning frame 20 with respect to a rotational axis direction of the charging roller 12. On the other hand, the conductive connecting portion 901*b* is inserted into inside of the cleaning frame 20 and contacts the charging roller bearing spring 910. And, as shown in part (a) through part (c) of FIG. 20, the contact portion 901*a* contacts the spring contact 911, which is a power supply member provided to the main assembly A. With the above configuration, the main assembly A is electrically connected to the charging roller 12 via the spring contact 911, the electrode plate 901, the charging roller bearing spring 910 and the charging roller bearing 61. Incidentally, the rotational axis direction of the charging roller 12 is approximately parallel to the longitudinal direction of the process cartridge B.

Next, the electrode plate 901 will be described in more detail. As shown in FIG. 16 and FIG. 20, the contact portion 901*a* of the electrode plate 901 includes a bottom surface 901*c* as a first surface, an inner wall 901*d* as a connecting surface provided around the bottom surface 901*c*, and an outermost surface 901*f* as a second surface. The outermost surface 901*f* is a surface which faces to an outermost side upon being mounted to the cleaning frame 20. The bottom surface 901*c* is a single flat surface provided at a position one step lower than the outermost surface 901*f*.

That is, the outermost surface 901*f* is positioned further outside of the cleaning frame 20 in a normal direction of the bottom surface 901*c* than the bottom surface 901*c*. In the present Embodiment, the outermost surface 901*f* is positioned further outside of the cleaning frame 20 with respect to the rotational axis direction of the charging roller 12 than the bottom surface 901*c*. In addition, the bottom surface 901*c* and the outermost surface 901*f* are formed approximately parallel to each other and are disposed so as to face to an outside of the cleaning frame 20 with respect to the rotational axis direction of the charging roller 12, respectively. In addition, in a state in which the process cartridge B is mounted to the main assembly A, the bottom surface 901*c* is provided so that an angle of the bottom surface 901*c* is preferably −45° or more and +45° or less, and more preferably −10° or more and +10° or less with respect to a direction of gravity. In the present Embodiment, the bottom surface 901*c* is provided so as to be parallel to the direction of gravity. Incidentally, the outermost surface 901*f* need only be positioned further outside of the cleaning frame 20 than the bottom surface 901*c*, and need not be parallel to the bottom surface 901*c*.

The spring contact 911, which is provided on the main assembly A side, is disposed so as to enter from a position opposite to the electrode plate 901 toward the bottom surface 901*c*. Specifically, the spring contact 911 is what is formed as a rod-shaped member made of metal is bent, and this bent portion enters from an outside of the cleaning frame 20 to the bottom surface 901*c* side passing the outermost surface 901*f*, and is capable of contacting a portion of the bottom surface 901*c* without contacting the outermost surface 901*f*. In the present Embodiment, it is configured as the spring contact 911 enters from outside to inside of the cleaning frame 20 to the bottom surface 901*c* side with respect to the rotational axis direction of the charging roller 12.

The inner wall 901*d* is an inclined surface provided so as to connect the outermost surface 901*f* and the bottom surface 901*c*, and is inclined with respect to the normal direction of the bottom surface 901*c*. An inside peripheral portion (inner peripheral portion), which is the bottom surface 901*c* side of the outermost surface 901*f*, is positioned further outside than an outer peripheral portion of the bottom surface 901*c*. The inner wall 901*d* is the inclined surface which connects the outer peripheral portion of the bottom surface 901*c* and the inner peripheral portion of the outermost surface 901*f*, and an inclination direction thereof is a direction away from the bottom surface 901*c* as it goes from the bottom surface 901*c* to the outermost surface 901*f*.

In addition, the inner wall 901*d* covers an entire periphery of the bottom surface 901*c*. The bottom surface 901*c*, the inner wall 901*d* and the outermost surface 901*f* in the present Embodiment provided in this manner are formed as a portion of a plate made of metal is recessed. Incidentally, the inner wall 901*d* need only connect the outermost surface 901*f* and the bottom surface 901C, and need not cover the entire periphery of the bottom surface 901*c*. However, from a viewpoint of suppressing scattering of sparks as described below, it is preferable that the inner wall 901*d* covers the entire periphery of the bottom surface 901*c*.

Here, in the inner wall 901*d*, a distance between the inner walls 901*d* opposite to each other (distance E1 and distance E2) is preferably sufficiently longer than a width through which the spring contact 911 enters the contact portion 901*a* (width E3 and width E4). By this, it becomes possible for the spring contact 911 to contact the bottom surface 901*c* without contacting the inner wall 901*d*. Therefore, it is configured as a disposition that, around a contact point 901*e* between the spring contact 911 and the bottom surface 901*c*, there is the inner wall 901*d*, and in a direction of an outer surface, there is the outermost surface 901*f*.

By this disposition, as shown in FIG. 21, even if a flammable foreign object is bitten at the contact point 901*e* and sparks are generated due to a tracking phenomenon, the inner wall 901*d*, which is a metallic member, functions as a fire spreading prevention wall. That is, by restricting a scattering direction of the generated sparks within a restricting area K, it becomes possible to suppress the scattering of the sparks into the cleaning frame 20. Here, the restricting area K is defined as following.

That is, as shown in FIG. 21, in a cross section perpendicular to the bottom surface 901*c*, in a case in which an arbitrary point on a boundary with the inner wall 901*d* and the outermost surface 901*f* is a first point $\alpha 1$, and a point opposite to the first point on the boundary with the inner wall 901*d* and the outermost surface 901*f* is a second point $\alpha 2$, a line connecting a center of the bottom surface 901*c* and the first point $\alpha 1$ is a first line $\beta 1$, and a line connecting the center of the bottom surface 901*c* and the second point $\alpha 2$ is a second line $\beta 2$. In an example shown in the figure, at the center of the bottom surface 901*c*, the contact point 901*e* between the bottom surface 901*c* and the spring contact 911 is disposed. And an area from the first line $\beta 1$ to the second line $\beta 2$ is defined as the restricting area K, which restricts the scattering of the sparks. In the present Embodiment, this restricting area K is configured to be 120° or more. That is, an angle formed by the first line $\beta 1$ and the second line $\beta 2$ is configured to be 120° or more. The angle between the first line $\beta 1$ and the second line $\beta 2$ is preferably 170° or less, more preferably 160° or less, and even more preferably 150° or less.

By setting the angle formed by the first line $\beta 1$ and the second line $\beta 2$ in this manner, it becomes possible to appropriately set a depth of the bottom surface 901*c* from the outermost surface 901*f* and the distance between the boundaries with the inner wall 901*d* and the outermost surface 901*f* which are opposite to each other. That is, if the depth of the bottom surface 901*c* from the outermost surface 901*f* is too deep, a dimension in this depth direction of the electrode plate 901 is increased, which results in an increase in size of the apparatus. In addition, if the distance between the boundaries with the inner wall 901*d* and the outermost surface 901*f* which are opposite to each other is too narrow with respect to this depth, it may not be possible to adequately suppress the scattering of the sparks. For this reason, in the present Embodiment, the restricting area K is stipulated as described above.

In addition, in the present Embodiment, the bottom surface 901*c* is disposed approximately parallel to the direction of gravity G. Therefore, the scattered sparks fall in the direction of gravity G, it is less likely to adhere to the cleaning frame 20. Incidentally, the bottom surface 901*c* needs not be parallel to the direction of gravity G but, for example, the bottom surface 901*c* may be inclined with respect to the direction of gravity G so as to face below.

In the present Embodiment, since it is possible to suppress that the sparks scatter to the cleaning frame 20 in this manner, as resin material for the cleaning frame 20, it becomes possible to choose material of which the flame retardancy is low. In general, comparing to the material of which the flame retardancy is low, resin of which the flame retardancy is high has a high resin weight due to an addition of additives, resulting in a high environmental load. By restricting the scattering of the sparks and choosing the material of which the flame retardancy is low, it becomes possible to obtain a configuration which is good for safety and environment.

Electrical Contact of the Developing Unit of the Process Cartridge

Next, an electrical contact of the developing unit 15 of the process cartridge B will be described using FIG. 14, FIG. 15, FIG. 22 and FIG. 23. FIG. 22 includes views illustrating electrical contacts of the main assembly A, which corresponds to the electrical contacts of the developing unit of the process cartridge B. FIG. 23 is a side view illustrating positions of the electrical contacts of the developing unit 15 when the developing roller 16 of the process cartridge B is in the state separated from the photosensitive drum 11.

As shown in FIG. 14 and FIG. 15, the process cartridge B includes, in the longitudinal direction thereof, at an end portion on an opposite side of the developing coupling 155, a developing contact (first electrical contact portion) 16b, which supplies power from the main assembly A to the developing roller 16, a developing blade contact (second electrical contact portion) 18a, which supplies power to the developing blade 18, and a supplying roller contact (third electrical contact portion) 13a, which supplies power to the supplying roller 13. That is, the developing contact 16b is an electrical contact portion which is electrically connected to the developing roller 16 and for the electric power to be supplied to the developing roller 16 being supplied from an outside of the process cartridge B. The developing blade contact 18a is an electrical contact portion which is electrically connected to the developing blade 18 and for the electric power to be supplied to the developing blade 18 being supplied from an outside of the process cartridge B. The supplying roller contact 13a is an electrical contact portion which is electrically connected to the supplying roller 13 and for the electric power to be supplied to the supplying roller 13 being supplied from an outside of the process cartridge B.

Here, the photosensitive drum 11 is configured to be rotated about a first rotational axis 11a. The developing roller 16 is configured to be rotated about a second rotational axis 16a. As shown in FIG. 14, an imaginary line passing through the first rotational axis 11a and the second rotational axis 16a is a first imaginary line L1 as seen in a direction of the first rotational axis 11a. In this case, the developing contact 16b, the developing blade contact 18a and the supplying roller contact 13a are provided on a second imaginary line L2 parallel to the first imaginary line L1 and aligned in a direction where the second imaginary line L2 extends. In addition, of the developing contact 16b, the developing blade contact 18a and the supplying roller contact 13a, the developing contact 16b is at the closest position to the developing roller 16. In addition, in the direction where the second imaginary line L2 extends, the developing contact 16b, the developing blade contact 18a and the supplying roller contact 13a are arranged in this order from a side close to the developing roller 16. In addition, the developing contact 16b, the developing blade contact 18a and the supplying roller contact 13a have a longer length in a direction perpendicular to the second imaginary line L2 as being farther from the developing roller 16 in the direction where the second imaginary line L2 extends.

In the present Embodiment, each contact point is disposed, in the mounting direction D, on an upstream side of the mounting direction from the swing axis 8. In addition, the order of each contact is arranged in an order of the developing contact 16b, the developing blade contact 18a and the supplying roller contact 13a from downstream side of the mounting direction, and each contact is disposed so that heights of each contact H16b, H18a and H13a in a direction perpendicular to the mounting direction D are H13a>H18a>H16b. In addition, the developing contact 16b, the developing blade contact 18a and the supplying roller contact 13a also have a longer length in a swinging direction centered on the swing axis 8 (pin 6), which is a swing center of the developing unit 15, as being further from the swing axis 8 in the arranged order. In FIG. 14, an imaginary arc M1 centered on the swing axis 8 passes through the developing contact 16b, an imaginary arc M2 centered on the swing axis 8 passes through the developing blade contact 18a and an imaginary arc M3 centered on the swing axis 8 passes through the supplying roller contact 13a. Directions indicated by these imaginary arcs are the swinging direction of the developing unit 15 centered on the swing axis 8 (pin 6), and as being farther from the swing axis 8, the lengths in this direction get longer. Incidentally, in the present Embodiment, as seen in the direction of the first rotational axis 11a, a position of the swing axis 8 (pin 6) is in a position between a position of the second rotational axis 16a and a position of the developing contact 16b in the direction where the second imaginary line L2 extends.

The main assembly A includes, as shown in part (a) of FIG. 22, a main assembly developing contact 108a, a main assembly developing blade contact 108b and a main assembly supplying roller contact 108c as contacts which correspond to the developing contact 16b, the developing blade contact 18a and the supplying roller contact 13a. These contacts are disposed so as to be higher in a direction perpendicular to the mounting direction D as it goes to the upstream side of the mounting direction. That is, these contacts are disposed so as to be higher in an order of the main assembly developing contact 108a, the main assembly developing blade contact 108b and the main assembly supplying roller contact 108c.

As shown in part (b) of FIG. 22, the main assembly supplying roller contact 108c is urged so as to project to the process cartridge B side by an urging spring 108d, which is urged toward the supplying roller contact 13a. Upon the mounting of the process cartridge B, it becomes possible to receive the process cartridge B by a tapered shape 108c2 of the main assembly supplying roller contact 108c. After completion of the mounting of the process cartridge B, by a main assembly supplying roller contact tip 108c1 of the main assembly supplying roller contact 108c contacting the supplying roller contact 13a, power supply is performed. The main assembly developing contact 108a and the main assembly developing blade contact 108b have the same configuration. When the main assembly contacts are disposed in this manner, as shown in FIG. 14, when the developing roller 16 is in contact with the photosensitive drum 11, points at which each contact point of the process cartridge B contacts the tip of the main assembly contact (108a1, 108b1 and 108c1) are disposed so that the contact points on the upstream side in the mounting direction are higher.

As shown in FIG. 23, in the state in which the developing roller 16 is separated from the photosensitive drum 11, since as it goes to the upstream side of the mounting direction, each contact point is away from the swinging center, an amount of movement of each contact point increases. As described above, since it is configured that the height of each contact point in the direction perpendicular to the mounting direction D is H13*a*>H18*a*>H16*b*, the tip of each main assembly contact (108*a*1, 108*b*1 and 108*c*1) does not fall off of each contact (16*b*, 18*a*, 13*a*) of the process cartridge B. In other words, it becomes possible to supply power to each contact point even when separated.

In addition, as shown in FIG. 23, the contact point at the most upstream in the mounting direction is disposed so that at least a portion of a position thereof when the photosensitive drum 11 and the developing roller 16 are in contact with each other and of a position when separated are overlapped as seen in the axial direction of the developing roller 16. By the configuration described above, it becomes possible to obtain the power supply contact stably even when separated without increasing a size of the process cartridge B. In addition, in the present Embodiment, it is configured that the order of the contacts is, from the downstream side of the mounting direction, the developing contact 16*b*, the developing blade contact 18*a* and the supplying roller contact 13*a*, however, the order may be different therefrom. For example, as shown in part (a) of FIG. 24, from the downstream side to the upstream side of the mounting direction D, the order may be the developing blade contact 18*a*, the supplying roller contact 13*a* and the developing contact 16*b*. In other words, it may be configured that, in the direction where the second imaginary line L2 extends, the developing blade contact 18*a*, the supplying roller contact 13*a* and the developing contact 16*b* are arranged in this order from the side close to the developing roller 16. In addition, as shown in part (b) of FIG. 24, from the downstream side to the upstream side of the mounting direction D, the order may be the supplying roller contact 13*a*, the developing blade contact 18*a* and the developing contact 16*b*. It may be configured that, in the direction where the second imaginary line L2 extends, the supplying roller contact 13*a*, the developing blade contact 18*a* and the developing contact 16*b* are arranged in this order from the side close to the developing roller 16.

Incidentally, in the above examples, the case in which the electrode plate 901, which is the charging contact, is the metal plate is described. However, the electrode plate 901 may be made of conductive resin, and even in this case, the same effect as described above can be obtained.

Embodiment 2

An Embodiment 2 will be described using FIG. 25. Incidentally, in the present Embodiment, a configuration of an electrode plate 902, which is a charging contact, is different from the Embodiment 1. Since other configurations and actions are the same as those in the Embodiment 1, with respect to the same configurations as in the Embodiment 1, the same reference numerals are attached thereto in order to omit or simplify illustration and description thereof, and, hereinafter, points different from those in the Embodiment 1 will be mainly described.

A contact portion 902*a* of the electrode plate 902 in the present Embodiment includes an inner wall 902*d* as a first surface and an outermost surface 902*f* as a second surface, which is positioned further outside of the cleaning frame 20 than the inner wall 902*d* with respect to the longitudinal direction of the process cartridge B. The inner wall 902*d* is configured by a plurality of flat surfaces of which normal directions are different from each other. The plurality of flat surfaces connect a vertex P farthest from the outermost surface 902*f* with respect to the longitudinal direction of the process cartridge B and the outermost surface 902*f*. In the present Embodiment, by the plurality of flat surfaces, a polygonal pyramid (without a bottom surface thereof) shape is formed. The outermost surface 902*f* is positioned further outside of the cleaning frame 20 than the vertex P of the polygonal pyramid with respect to the longitudinal direction of the process cartridge B. In addition, in the present Embodiment, the inner wall 902*d* is constituted by four flat surfaces, each of which has a triangular shape.

With such a geometry, the spring contact 911 and the electrode plate 902 contact at a contact point 902*e* on the inner wall 902*d*. By this, in a case in which sparks generated from the contact point 902*e* on the inner wall 902*d* scatter, it becomes possible for a part of other surfaces, which is not a part of the inner wall 902*d* from which the sparks are generated, to restrict the scattering of the sparks, respectively. For example, as shown in FIG. 25, it is assumed that the contact point 902*e* is on a part of surface 902*d*1 of the inner wall 902*d* and the sparks are generated on this surface 902*d*1. Even in that case, since the inner wall 902*d* has the polygonal pyramidal shape described above, the other surfaces 902*d*2, 902*d*3 and 902*d*4 of the inner wall 902*d* function as fire spreading prevention walls. By this, it becomes possible to suppress the sparks from scattering to the cleaning frame 20.

In addition, in the present Embodiment, a restricting area K is stipulated as following. That is, in a case in which an arbitrary point on a boundary with the plurality of flat surfaces and the outermost surface 902*f* is a first point and a point at a position opposite to the first point in a cross section passing through the vertex and the first point on the boundary with the plurality of flat surfaces and the outermost surface 902*f* is a second point, an area between a first line connecting the vertex P and the first point and a second line connecting the vertex P and the second point is the restricting area K. And an angle between the first line and the second line is configured to be 120° or more.

In other words, in a case in which, of the plurality of flat surfaces constituting the inner wall 902*d*, any flat surface is a first flat surface, and a flat surface at a position opposite to the first flat surface is a second flat surface, an area from the first flat surface to the second flat surface is the restricting area K, which restricts the scattering of the sparks. In the present Embodiment, this restricting area K is configured to be 120° or more. That is, an angle between the first flat surface and the second flat surface is configured to be 120° or more. Specifically, an angle between the surface 902*d*1 and a surface 902*d*3 opposite to this surface 902*d*1 is configured to be 120° or more, and an angle between a surface 902*d*2 and a surface 902*d*4 opposite to this surface 902*d*2 is configured to be 120° or more. An upper limit of the angle of the restricting area K is the same as in the Embodiment 1.

Incidentally, in the above example, the inner wall 902*d* is configured to have a recessed shape having the polygonal pyramid shape, however, the inner wall 902*d* may have a conical shape. In addition, a cross sectional shape of the inner wall 902*d*, which is parallel to the outermost surface 902*f*, may have, other than a polygonal shape or a circular shape, an oval shape or a shape combining an arc and a plane, etc.

Other Embodiments

In each of the above Embodiments, the example of the electrode plate configuration provided to the process cartridge B as a cartridge is described, however, this is an example of configurations, and the effect thereof is not limited to the process cartridge B but, for example, it may be a conductive contact portion provided to the developing unit 15. In this case, for example, at least any one of the developing roller 16, the supplying roller 13 and the developing blade 18 corresponds to the process member.

Here, the cartridge refers to what includes at least one of the process members such as the developer, the image bearing member such as the photosensitive drum and the charging member which acts on the photosensitive drum, and is mountable to and demountable from the main assembly of the image forming apparatus of electrophotographic type. Typical examples of the cartridge include a process cartridge, which combines the photosensitive drum and the developing unit, a drum cartridge, which includes the photosensitive drum, the charging roller and the cleaning member (cleaning unit described above), a developing cartridge (developing unit described above) and a toner cartridge, which accommodates the toner. The present invention is applicable to these various types of cartridge.

In addition, in each of the Embodiments described above, the image forming apparatus which includes a single photosensitive drum is described, however, the present invention is not limited thereto, but can be applied, for example, to a color image forming apparatus of tandem type which includes a plurality of photosensitive drums.

Furthermore, in each of the Embodiments described above, the laser printer is described as an example of the image forming apparatus, however, an LED printer or the like may be an example of the image forming apparatus. The image forming apparatus is what forms the image on a recording media (e.g., a plain paper, a sheet of synthetic resin which is a substitute for the plain paper, a thick paper, sheet material such as a sheet for an overhead projector, etc.) using electrophotographic image forming type. Thus, the image forming apparatus of the present invention includes a copy machine, a printer, a facsimile and a multifunction machine which includes a plurality of these functions.

In addition, disclosure of the present Embodiments includes the following constitutions.

Constitution 1

A cartridge comprising:
- a frame;
- a process member supported by the frame and used for an image forming process; and
- an electrode member electrically connected to the process member,
- wherein the electrode member includes an electrical contact portion exposed to outside of the cartridge and to which an electric power for being supplied to the process member is supplied from outside of the cartridge, and
- wherein the electrical contact portion includes a first surface which is a flat surface, a second surface positioned further outside of the frame in a normal direction of the first surface than the first surface and a connection surface connecting the first surface and the second surface.

Constitution 2

The cartridge according to Constitution 1, wherein the connection surface is inclined to the normal direction of the first surface.

Constitution 3

The cartridge according to Constitution 1 or 2, wherein in a cross section perpendicular to the first surface, in a case in which an arbitrary point on a boundary with the connection surface and the second surface is a first point and a point at a position opposite to the first point on the boundary with the connection surface and is a second point, an angle between a first line connecting a center of the first surface and the first point and a second line connecting the center and the second point is 120° or more.

Constitution 4

The cartridge according to any one of Constitutions 1 to 3, wherein the cartridge is constituted so as to be mountable to and dismountable from a main assembly of an image forming apparatus, and
- wherein in a state in which the cartridge is mounted to the main assembly, the first surface is provided so that an angle of the first surface is −45° or more and +45° or less with respect to a direction of gravity.

Constitution 5

The cartridge according to any one of Constitutions 1 to 4, wherein the connection surface is provided so as to cover an entire periphery of the first surface.

Constitution 6

The cartridge according to any one of Constitutions 1 to 5, wherein the frame is constituted by a resin material of which flame retardancy based on UL94 standard is HB.

Constitution 7

The cartridge according to any one of Constitutions 1 to 6, wherein the electrode member is made of metal.

Constitution 8

The cartridge according to any one of Constitutions 1 to 7, wherein the process member is a charging roller configured to charge a surface of a photosensitive member.

Constitution 9

A cartridge mountable to and dismountable from a main assembly of an image forming apparatus, the cartridge comprising:
- a frame;
- a process member supported by the frame and used for an image forming process; and
- an electrode member electrically connected to the process member,
- wherein the electrode member includes an electrical contact portion exposed to outside of the cartridge and configured to contact a main assembly side electrode member of the main assembly, and
- wherein the electrical contact portion includes a first surface configured by a plurality of flat surfaces of which angles in normal direction thereof are different from each other and a second surface positioned further outside of the frame than the first surface.

Constitution 10

The cartridge according to Constitution 9, wherein the plurality of flat surfaces connect a vertex farthest from the second surface and the second surface.

Constitution 11

The cartridge according to Constitution 10, wherein in a case in which an arbitrary point on a boundary with the plurality of flat surfaces and the second surface is a first point and a point at a position opposite to the first point in a cross section passing through the vertex and the first point on the boundary with the plurality of flat surfaces and the second surface, an angle between a first line connecting the vertex and the first point and a second line connecting the vertex and the second point is 120° or more.

Constitution 12

The cartridge according to any one of Constitutions 9 to 11, wherein the frame is constituted by a resin material of which flame retardancy based on UL94 standard is HB.

Constitution 13

The cartridge according to any one of Constitutions 9 to 12, wherein the electrode member is made of metal.

Constitution 14

The cartridge according to any one of Constitution 9 to 13, wherein the process member is a charging roller configured to charge a surface of a photosensitive member.

Constitution 15

An image forming apparatus comprising:
- a main assembly of the image forming apparatus; and
- a process cartridge mountable to or dismountable from the main assembly and including a photosensitive member, a charging member configured to charge a surface of the photosensitive member, a developing unit configured to develop an electrostatic latent image formed on the surface of the photosensitive member and a cleaning member configured to clean the surface of the photosensitive member,
- wherein the process cartridge is the cartridge according to any one of Constitutions 1 to 14.

Constitution 16

A cartridge comprising:
- a photosensitive drum configured to rotate about a first rotational axis;
- a developing roller configured to supply toner to the photosensitive drum and rotate about a second rotational axis;
- a developing blade configured to regulate a layer thickness of the toner carried by developing roller;
- a supplying roller configured to supply the toner to the developing roller; a first electrical contact portion electrically connected to the developing roller and to which an electric power for being supplied to the developing roller is supplied from outside of the cartridge;
- a second electrical contact portion electrically connected to the developing blade and to which an electric power for being supplied to the developing blade is supplied from outside of the cartridge; and
- a third electrical contact portion electrically connected to the supplying roller and to which an electric power for being supplied to the supplying roller is supplied from outside of the cartridge,
- wherein in a case in which an imaginary line passing through the first rotational axis and the second rotational axis is a first imaginary line as seen in a direction of the first rotational axis, as seen in the direction of the first rotational axis, the first electrical contact portion, the second electrical contact portion and the third electrical contact portion are provided on a second imaginary line parallel to the first imaginary line and aligned in a direction where the second imaginary line extends.

Constitution 17

The cartridge according to Constitution 16, wherein as seen in the direction of the first rotational axis, of the first electrical contact portion, the second electrical contact portion and the third electrical contact portion, the first electrical contact portion is at the farthest position from the developing roller.

Constitution 18

The cartridge according to Constitution 16 or 17, wherein in the direction where the second imaginary line extends, the first electrical contact portion, the second electrical contact portion and the third electrical contact portion are arranged in this order from a side close to the developing roller.

Constitution 19

The cartridge according to any one of Constitutions 16 to 18, wherein the first electrical contact portion, the second electrical contact portion and the third electrical contact portion have a longer length in a direction perpendicular to the second imaginary line as being farther from the developing roller in the direction where the second imaginary line extends.

Constitution 20

The cartridge according to any one of Constitutions 16 to 19, further comprising a drum unit including the photosensitive drum, and a developing unit including the developing roller, the supplying roller and developing blade and rotatably supported by the drum unit about a swing axis in a direction where the developing roller approaches the photosensitive drum, wherein as seen in the direction of the first rotational axis, a position of the swing axis is in a position between a position of the second rotational axis and a position of the first electrical contact portion in the direction where the second imaginary line extends.

INDUSTRIAL APPLICABILITY

According to the present invention, there is provided the cartridge with a high degree of freedom in choices for the material for the frame and the image forming apparatus provided with the cartridge.

The present invention is not limited to the Embodiments described above, and various changes and variations are possible without departing from the spirit and the scope of the present invention. Accordingly, the following claims are appended to make public the scope of the present invention.

This application claims priority based on Japanese Patent Application No. 2022-102277 filed on Jun. 24, 2022, all of which are hereby incorporated herein by reference.

The invention claimed is:

1. A cartridge comprising:

a frame;

a process member supported by the frame and used for an image forming process; and an electrode member electrically connected to the process member, wherein the electrode member includes an electrical contact portion exposed to outside of the cartridge and through which electric power is supplied to the process member from outside of the cartridge, and wherein the electrical contact portion includes a first surface which is a flat surface, a second surface positioned further outside of the frame in a normal direction of the first surface than the first surface and a connection surface which connects the first surface and the second surface and which is inclined with respect to the first surface, wherein, as viewed in the normal direction of the first surface, the second surface is positioned outside of the first surface with the connection surface interposed therebetween, and wherein each of the first surface and the second surface is an electrically conductive surface of the electrode member.

2. The cartridge according to claim 1, wherein the connection surface is inclined with respect to the normal direction of the first surface.

3. The cartridge according to claim 1, wherein in a cross section perpendicular to the first surface, in a case in which an arbitrary point on a boundary between the connection surface and the second surface is a first point and a point located opposite to the first point with respect to a center of the first surface on the boundary between the connection surface and the second surface is a second point, an angle between a first line connecting the center of the first surface and the first point and a second line connecting the center and the second point is 120° or more.

4. The cartridge according to claim 1, wherein the cartridge is constituted so as to be mountable to and dismountable from a main assembly of an image forming apparatus, and wherein in a state in which the cartridge is mounted to the main assembly, the first surface is provided so that an angle of the first surface is −45° or more and +45° or less with respect to a direction of gravity.

5. The cartridge according to claim 1, wherein the connection surface is provided so as to cover an entire periphery of the first surface.

6. The cartridge according to claim 1, wherein the frame is constituted by a resin material of which flame retardancy based on UL94 standard is HB.

7. The cartridge according to claim 1, wherein the electrode member is made of metal.

8. The cartridge according to claim 1, wherein the process member is a charging roller configured to charge a surface of a photosensitive member.

9. An image forming apparatus comprising:

a main assembly of the image forming apparatus; and a process cartridge mountable to or dismountable from the main assembly and including a photosensitive member, a charging member configured to charge a surface of the photosensitive member, a developing unit configured to develop an electrostatic latent image formed on the surface of the photosensitive member and a cleaning member configured to clean the surface of the photosensitive member, wherein the process cartridge is the cartridge according to claim 1.

10. A cartridge mountable to and dismountable from a main assembly of an image forming apparatus, the cartridge comprising:

a frame;

a process member supported by the frame and used for an image forming process; and an electrode member electrically connected to the process member, wherein the electrode member includes an electrical contact portion exposed to outside of the cartridge and configured to contact a main assembly side electrode member of the main assembly, and wherein the electrical contact portion includes a first surface configured by a plurality of flat surfaces of which angles in normal direction thereof are different from each other and a second surface positioned further outside of the frame than the first surface.

11. The cartridge according to claim 10, wherein the plurality of flat surfaces connect a vertex farthest from the second surface and the second surface.

12. The cartridge according to claim 11, wherein in a case in which an arbitrary point on a boundary between the plurality of flat surfaces and the second surface is a first point and a point at a position opposite to the first point in a cross section passing through the vertex and the first point on the boundary between the plurality of flat surfaces and the second surface is a second point, an angle between a first line connecting the vertex and the first point and a second line connecting the vertex and the second point is 120° or more.

13. The cartridge according to claim 10, wherein the frame is constituted by a resin material of which flame retardancy based on UL94 standard is HB.

14. The cartridge according to claim 10, wherein the electrode member is made of metal.

15. The cartridge according to claim 10, wherein the process member is a charging roller configured to charge a surface of a photosensitive member.

* * * * *